United States Patent
Guim Bernat et al.

(10) Patent No.: US 11,522,682 B2
(45) Date of Patent: *Dec. 6, 2022

(54) TECHNOLOGIES FOR PROVIDING STREAMLINED PROVISIONING OF ACCELERATED FUNCTIONS IN A DISAGGREGATED ARCHITECTURE

(71) Applicant: Intel Corporation, Santa Clara, CA (US)

(72) Inventors: Francesc Guim Bernat, Barcelona (ES); Suraj Prabhakaran, Aachen (DE); Kshitij A. Doshi, Tempe, AZ (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/332,733

(22) Filed: May 27, 2021

(65) Prior Publication Data

US 2021/0288793 A1 Sep. 16, 2021

Related U.S. Application Data

(63) Continuation of application No. 15/912,733, filed on Mar. 6, 2018, now Pat. No. 11,025,411.

(Continued)

(30) Foreign Application Priority Data

Aug. 30, 2017 (IN) .............................. 201741030632

(51) Int. Cl.
*H04L 9/08* (2006.01)
*G06F 3/06* (2006.01)
(Continued)

(52) U.S. Cl.
CPC ........ *H04L 9/0819* (2013.01); *B25J 15/0014* (2013.01); *G06F 1/183* (2013.01);
(Continued)

(58) Field of Classification Search
CPC . H04L 9/0819; H04L 9/0894; H04L 41/0213; H04L 41/0668; H04L 41/0677;
(Continued)

(56) References Cited

U.S. PATENT DOCUMENTS

2011/0264511 A1 10/2011 Zhang
2015/0293699 A1 10/2015 Bromley et al.
(Continued)

OTHER PUBLICATIONS

Votice of Allowance for U.S. Appl. No. 15/912,733, dated Jan. 25, 2021, 19 pages.

*Primary Examiner* — Michael A Keller
*Assistant Examiner* — Jsing Forng Lin
(74) *Attorney, Agent, or Firm* — Compass IP Law PC

(57) ABSTRACT

Technologies for providing streamlined provisioning of accelerated functions in a disaggregated architecture include a compute sled. The compute sled includes a network interface controller and circuitry to determine whether to accelerate a function of a workload executed by the compute sled, and send, to a memory sled and in response to a determination to accelerate the function, a data set on which the function is to operate. The circuitry is also to receive, from the memory sled, a service identifier indicative of a memory location independent handle for data associated with the function, send, to a compute device, a request to schedule acceleration of the function on the data set, receive a notification of completion of the acceleration of the function, and obtain, in response to receipt of the notification and using the service identifier, a resultant data set from the memory sled. The resultant data set was produced by an (Continued)

accelerator device during acceleration of the function on the data set. Other embodiments are also described and claimed.

27 Claims, 21 Drawing Sheets

Related U.S. Application Data

(60) Provisional application No. 62/584,401, filed on Nov. 10, 2017.

(51) Int. Cl.

| | | |
|---|---|---|
| G06F 9/50 | (2006.01) | |
| H04L 69/12 | (2022.01) | |
| H04L 69/32 | (2022.01) | |
| G06F 16/25 | (2019.01) | |
| G06F 16/2453 | (2019.01) | |
| H04L 49/9005 | (2022.01) | |
| G11C 8/12 | (2006.01) | |
| G11C 29/02 | (2006.01) | |
| H04L 41/0896 | (2022.01) | |
| G06F 30/34 | (2020.01) | |
| B25J 15/00 | (2006.01) | |
| G06F 1/18 | (2006.01) | |
| G06F 1/20 | (2006.01) | |
| G06F 11/34 | (2006.01) | |
| G06F 15/78 | (2006.01) | |
| H04L 41/5025 | (2022.01) | |
| H04L 67/1008 | (2022.01) | |
| H05K 7/14 | (2006.01) | |
| H05K 7/18 | (2006.01) | |
| H05K 7/20 | (2006.01) | |
| H04L 67/1001 | (2022.01) | |
| G11C 29/36 | (2006.01) | |
| G11C 29/38 | (2006.01) | |
| G11C 29/44 | (2006.01) | |
| G06F 16/22 | (2019.01) | |
| G06F 16/2455 | (2019.01) | |
| G06F 12/02 | (2006.01) | |
| G06F 12/14 | (2006.01) | |
| G06F 13/16 | (2006.01) | |
| G06F 15/173 | (2006.01) | |
| G06F 13/40 | (2006.01) | |
| G06F 13/42 | (2006.01) | |
| G06F 9/448 | (2018.01) | |
| G06F 9/28 | (2006.01) | |
| G06F 15/16 | (2006.01) | |
| H04L 41/0893 | (2022.01) | |
| H04L 69/22 | (2022.01) | |
| H04L 69/321 | (2022.01) | |
| H04L 41/0213 | (2022.01) | |
| H04L 41/0668 | (2022.01) | |
| H04L 41/0677 | (2022.01) | |
| H04L 45/28 | (2022.01) | |
| H04L 45/7453 | (2022.01) | |
| H04L 47/11 | (2022.01) | |
| H04L 47/125 | (2022.01) | |
| H04L 49/00 | (2022.01) | |
| H04L 49/351 | (2022.01) | |
| G06F 9/4401 | (2018.01) | |
| G06F 9/445 | (2018.01) | |
| G06F 12/06 | (2006.01) | |
| G06F 16/23 | (2019.01) | |
| G06F 16/248 | (2019.01) | |
| G06F 16/901 | (2019.01) | |
| G06F 16/11 | (2019.01) | |
| G06F 9/44 | (2018.01) | |
| G06F 9/48 | (2006.01) | |
| G06F 21/10 | (2013.01) | |
| G06N 3/063 | (2006.01) | |
| G06Q 10/06 | (2012.01) | |
| G06Q 30/02 | (2012.01) | |
| H04L 41/14 | (2022.01) | |
| H04L 41/5019 | (2022.01) | |
| H04L 49/40 | (2022.01) | |
| H04L 9/40 | (2022.01) | |
| G06F 12/0802 | (2016.01) | |
| G06F 12/1045 | (2016.01) | |

(52) U.S. Cl.
CPC .............. *G06F 1/20* (2013.01); *G06F 3/0604* (2013.01); *G06F 3/065* (2013.01); *G06F 3/0605* (2013.01); *G06F 3/067* (2013.01); *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02); *G06F 9/505* (2013.01); *G06F 9/5044* (2013.01); *G06F 9/5088* (2013.01); *G06F 11/3442* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 15/7807* (2013.01); *G06F 15/7867* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 41/5025* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 67/1001* (2022.05); *H04L 67/1008* (2013.01); *H04L 69/12* (2013.01); *H04L 69/22* (2013.01); *H04L 69/32* (2013.01); *H04L 69/321* (2013.01); *H05K 7/1489* (2013.01); *H05K 7/18* (2013.01); *H05K 7/20209* (2013.01); *H05K 7/20736* (2013.01); *G06F 9/44* (2013.01); *G06F 9/4401* (2013.01); *G06F 9/4856* (2013.01); *G06F 9/5061* (2013.01); *G06F 12/0802* (2013.01); *G06F 12/1054* (2013.01); *G06F 12/1063* (2013.01); *G06F*

*13/4022* (2013.01); *G06F 21/105* (2013.01); *G06F 2200/201* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01); *G06N 3/063* (2013.01); *G06Q 10/0631* (2013.01); *G06Q 30/0283* (2013.01); *H04L 41/14* (2013.01); *H04L 41/5019* (2013.01); *H04L 49/40* (2013.01); *H04L 63/0428* (2013.01); *H05K 7/1498* (2013.01)

(58) Field of Classification Search
CPC .............. H04L 41/0893; H04L 41/0896; H04L 41/5025; H04L 45/28; H04L 45/7453; H04L 47/11; H04L 47/125; H04L 49/30; H04L 49/351; H04L 49/9005; H04L 67/1002; H04L 67/1008; H04L 69/12; H04L 69/22; H04L 69/32; H04L 69/321; H04L 41/14; H04L 41/5019; H04L 63/0428; G06F 3/0604; G06F 3/0605; G06F 3/0611; G06F 3/0613; G06F 3/0629; G06F 3/0631; G06F 3/0632; G06F 3/0644; G06F 3/0647; G06F 3/065; G06F 3/0659; G06F 3/067; G06F 3/0673; G06F 3/0683; G06F 3/0685; G06F 9/28; G06F 9/4406; G06F 9/4411; G06F 9/445; G06F 9/4494; G06F 9/5044; G06F 9/505; G06F 9/5088; G06F 11/3442; G06F 12/023; G06F 12/06; G06F 12/0607; G06F 12/14; G06F 13/1663; G06F 13/1668; G06F 13/4068; G06F 13/42; G06F 15/161; G06F 15/17331; G06F 16/119; G06F 16/221; G06F 16/2237; G06F 16/2255; G06F 16/2282; G06F 16/2365; G06F 16/2453; G06F 16/2455; G06F 16/24553; G06F 16/248; G06F 16/25; G06F 16/9014; G06F 30/34; G06F 9/4401; G06F 9/4856; G06F 12/0802; G06F 12/1054; G06F 12/1063; G06F 21/105; G06F 2201/85; G06F 2209/509; G06F 2212/1044; G06F 2212/1052; G06F 2212/601; G06F 2213/0064; G11C 8/12; G11C 29/028; G11C 29/36; G11C 29/38; G11C 29/44; H05K 7/1489; H05K 7/18; H05K 7/20736; H05K 7/1498; G06N 3/063; G06Q 30/0283
See application file for complete search history.

(56) References Cited

U.S. PATENT DOCUMENTS

| | | |
|---|---|---|
| 2017/0075856 A1 | 3/2017 | Suzue et al. |
| 2017/0171302 A1 | 6/2017 | Seo et al. |
| 2017/0235671 A1* | 8/2017 | Jung .................... G06F 12/063 |
| | | 711/202 |
| 2018/0217856 A1 | 8/2018 | Wu et al. |

* cited by examiner

TECHNOLOGIES FOR PROVIDING STREAMLINED PROVISIONING OF ACCELERATED FUNCTIONS IN A DISAGGREGATED ARCHITECTURE

CROSS-REFERENCE TO RELATED APPLICATIONS

The present application is a continuation of U.S. patent application Ser. No. 15/912,733, filed Mar. 6, 2018, which claims the benefit of Indian Provisional Patent Application No. 201741030632, filed Aug. 30, 2017 and U.S. Provisional Patent Application No. 62/584,401, filed Nov. 10, 2017.

BACKGROUND

In some data centers, a compute device may be equipped with a general purpose processor and an accelerator device (e.g., a field programmable gate array (FPGA), an application specific integrated circuit (ASIC), a co-processor, etc.) capable of accelerating a function in a workload (e.g., an application) executed by the compute device. That is, the accelerator device is connected to the general purpose processor through a local bus (e.g., a Peripheral Component Interconnect express (PCIe) bus). In such systems, the compute device retains exclusive control over the accelerator device and the accelerator device may go unused for significant amounts of time, even when workloads executed by other compute devices in the data center could benefit from acceleration. In other systems, accelerator devices may be disaggregated from (e.g., physically separated from) a compute device that is executing a workload, but can be selectively allocated for use by the compute device through a network connection. In some instances, an intermediary compute device may coordinate the allocation of disaggregated accelerator devices to compute devices on an as-requested basis, and, in doing so, may receive and send data between the devices. As the number of compute devices and accelerator devices the data center increases, the communication of data to and from the intermediary compute device increases accordingly, and may result in network congestion and latency that may diminish any speed increases that would otherwise be obtained from accelerating portions of workloads.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
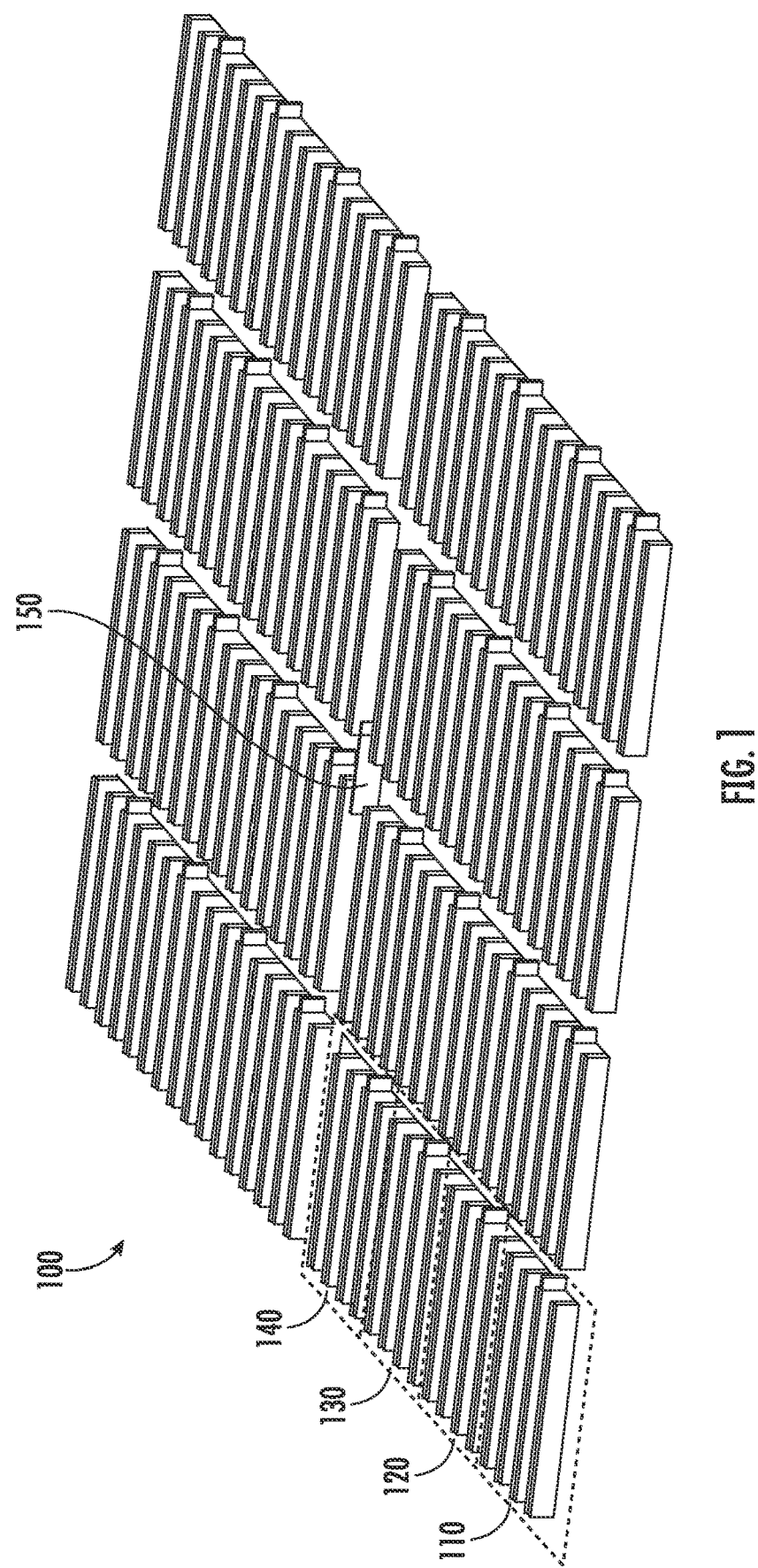
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. As described in more detail herein, each rack houses multiple sleds, which each may be embodied as a compute device, such as a server, that is primarily equipped with a particular type of resource (e.g., memory devices, data storage devices, accelerator devices, general purpose processors). In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. As described in more detail herein, resources within sleds in the data center 100 may be allocated to a group (referred to herein as a "managed node") containing resources from one or more other sleds to be collectively utilized in the execution of a workload. The workload can execute as if the resources belonging to the managed node were located on the same sled. The resources in a managed node may even belong to sleds belonging to different racks, and even to different pods 110, 120, 130, 140. Some resources of a single sled may be allocated to one managed node while other resources of the same sled are allocated to a different managed node (e.g., one processor assigned to one managed node and another processor of the same sled assigned to a different managed node). By disaggregating resources to sleds comprised predominantly of a single type of resource (e.g., compute sleds comprising primarily compute resources, memory sleds containing primarily memory resources), and selectively allocating and deallocating the disaggregated resources to form a managed node assigned to execute a workload, the data center 100 provides more efficient resource usage over typical data centers comprised of hyperconverged servers containing compute, memory, storage and perhaps additional resources). As such, the data center 100 may provide greater performance (e.g., throughput, operations per second, latency, etc.) than a typical data center that has the same number of resources.

Figure 2:
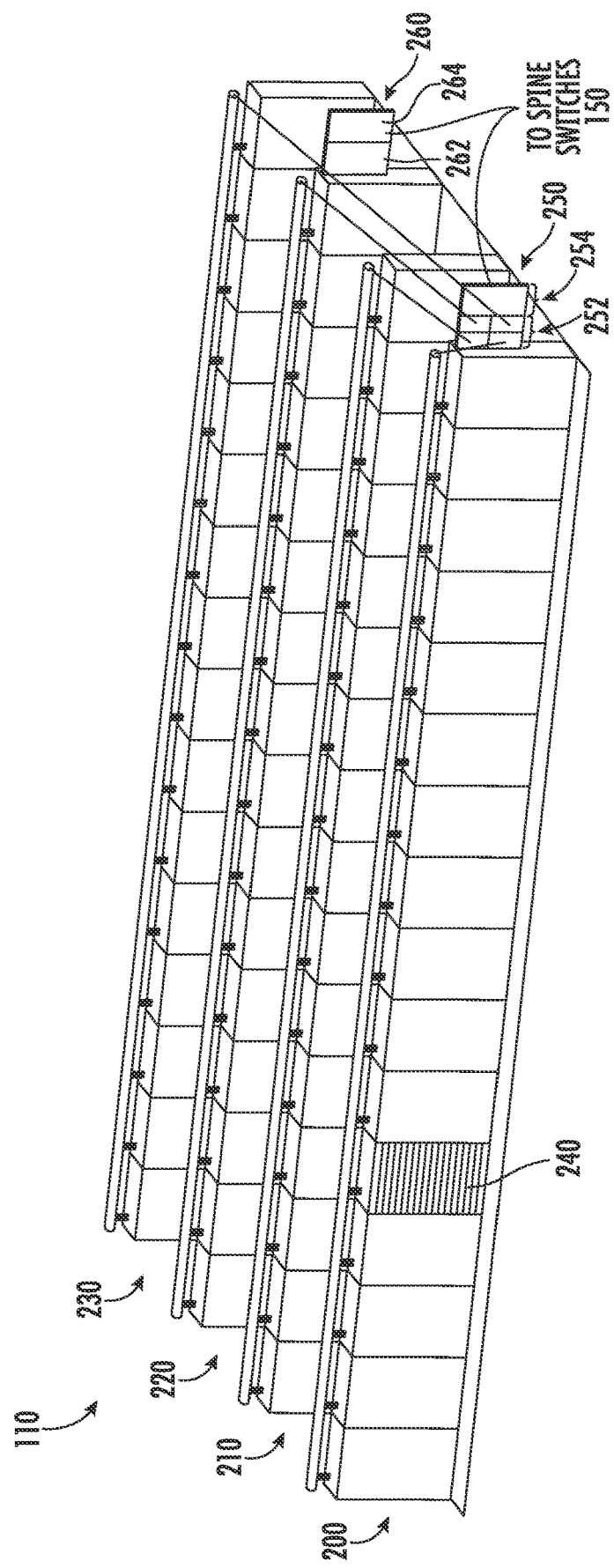
FIG. 2 is a simplified diagram of at least one embodiment of a pod of the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, Infiniband) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to different number of pod switches (e.g., providing even more failover capacity).

Figure 3:
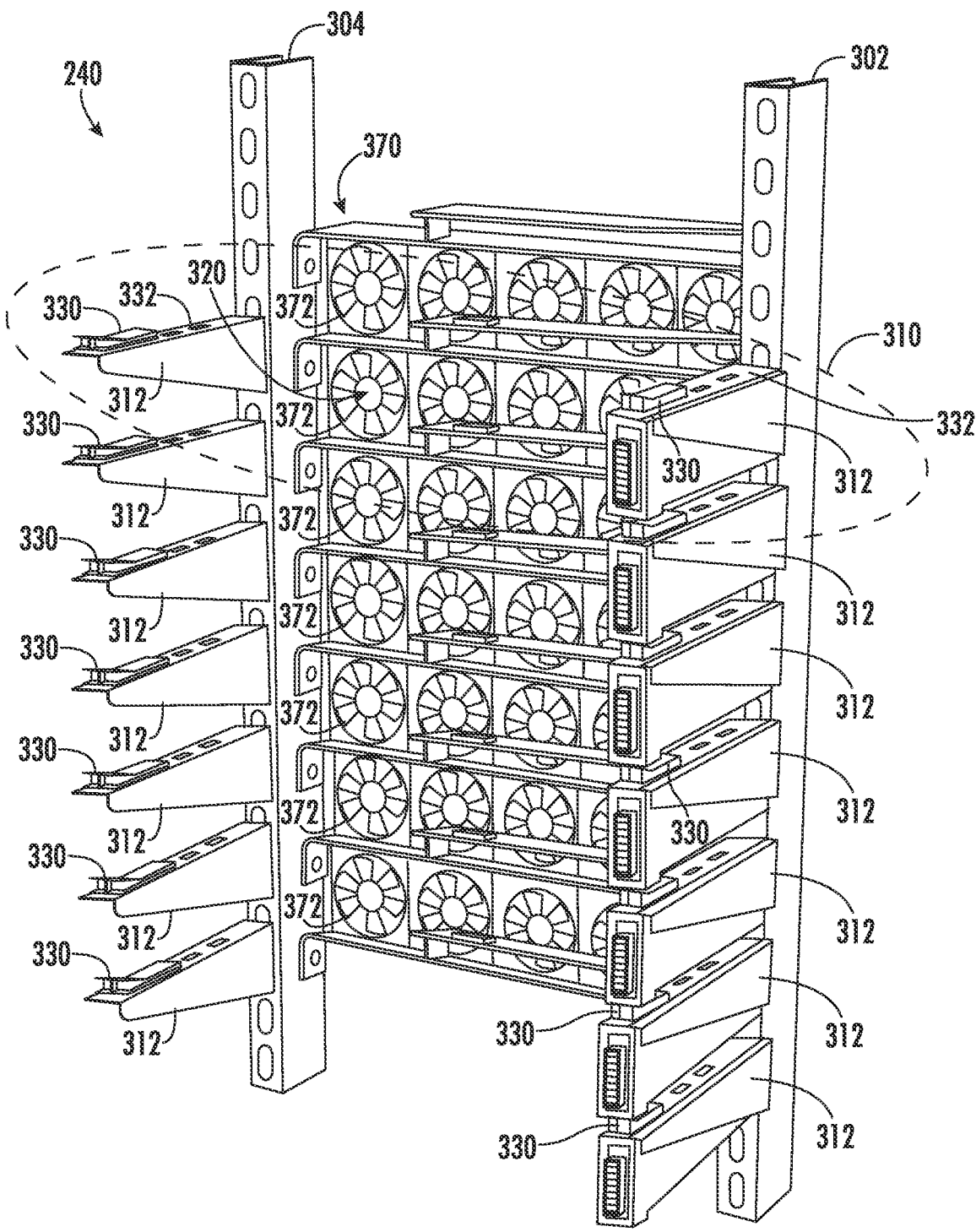
FIG. 3 is a perspective view of at least one embodiment of a rack that may be included in the pod of FIG. 2.
Figure 4:
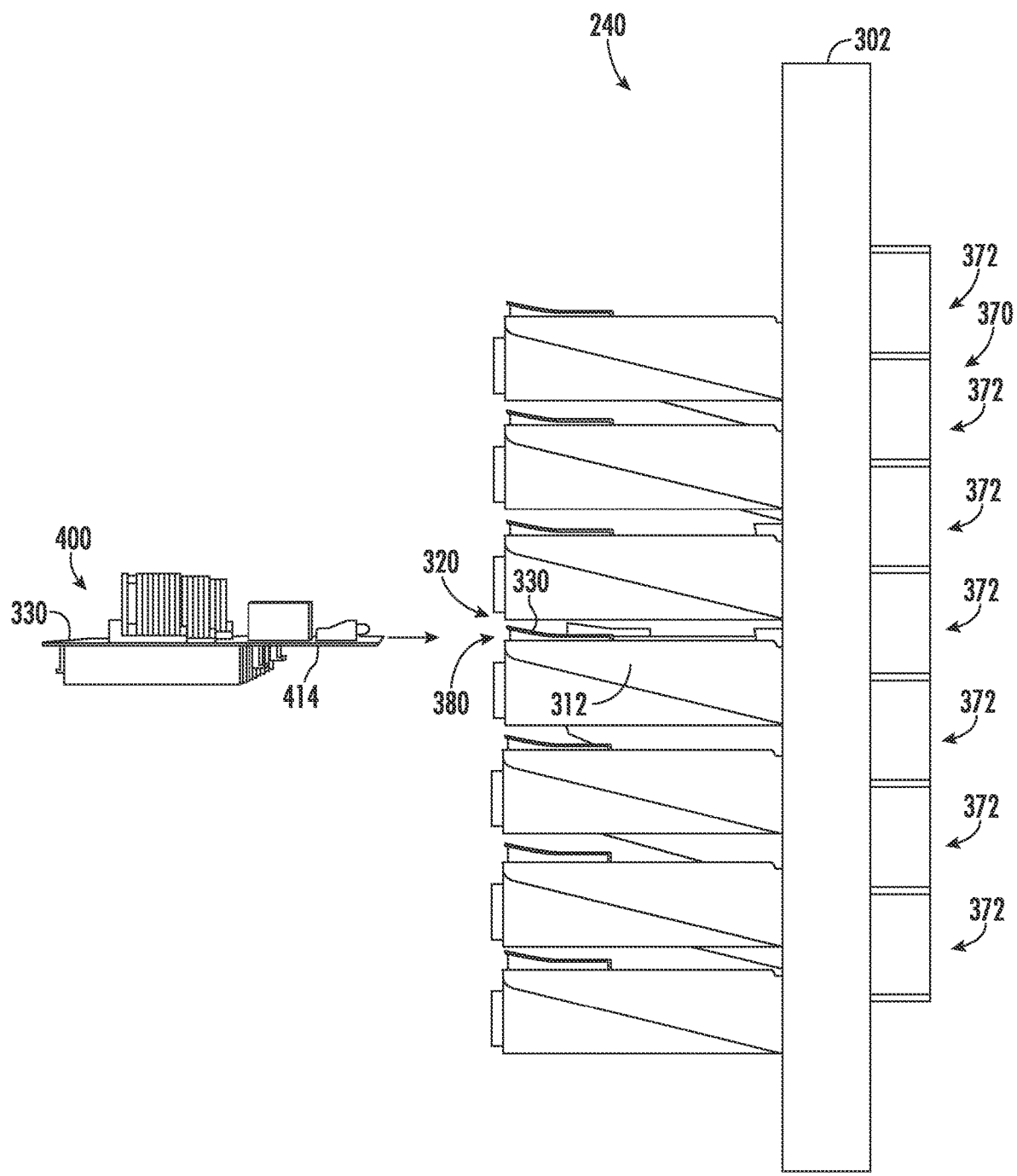
FIG. 4 is a side plan elevation view of the rack of FIG. 3.
Figure 5:
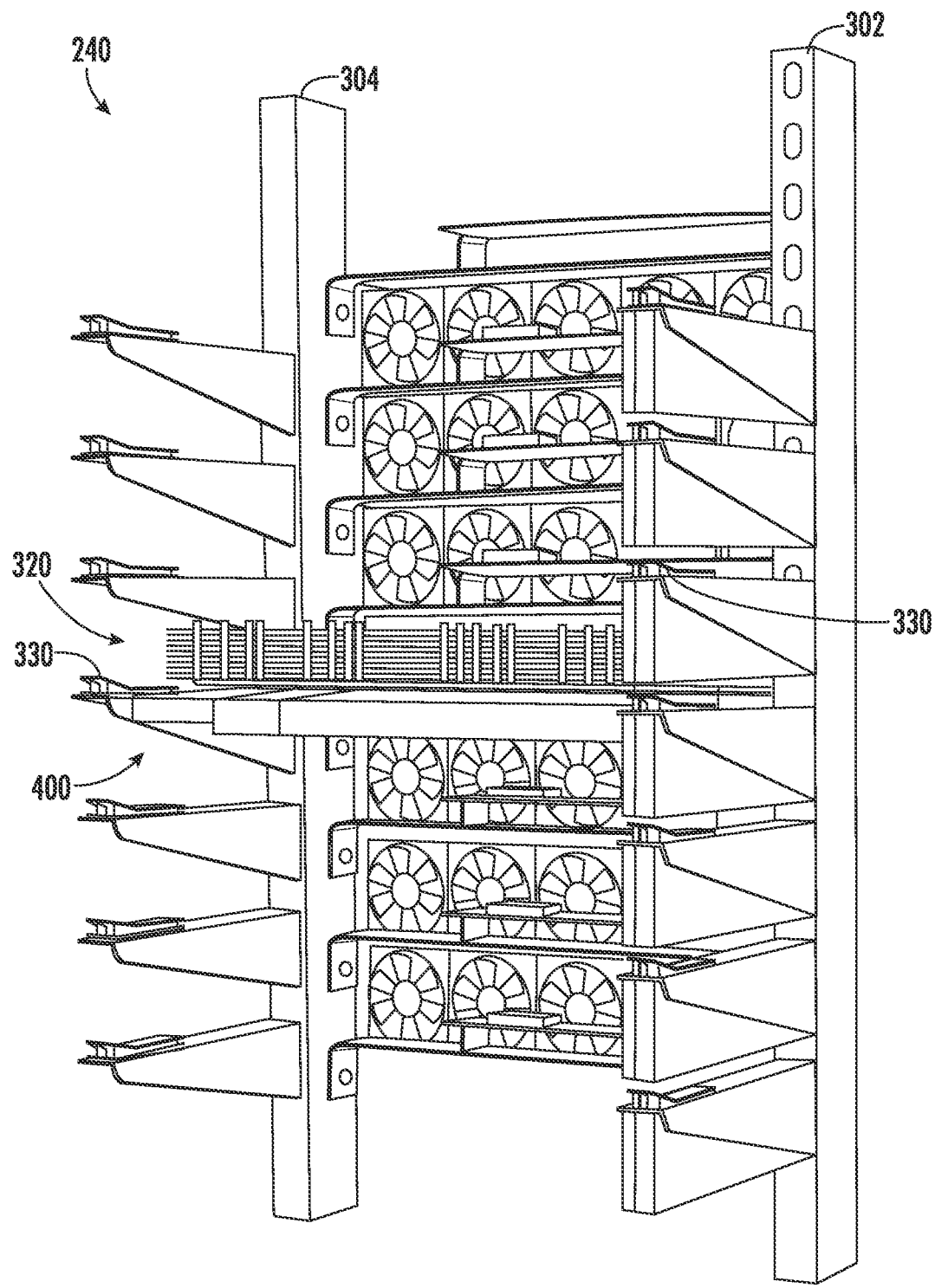
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which the interconnect may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable enters the connector mechanism. Subsequently, the optical fiber inside the cable enters a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240.

Figure 6:
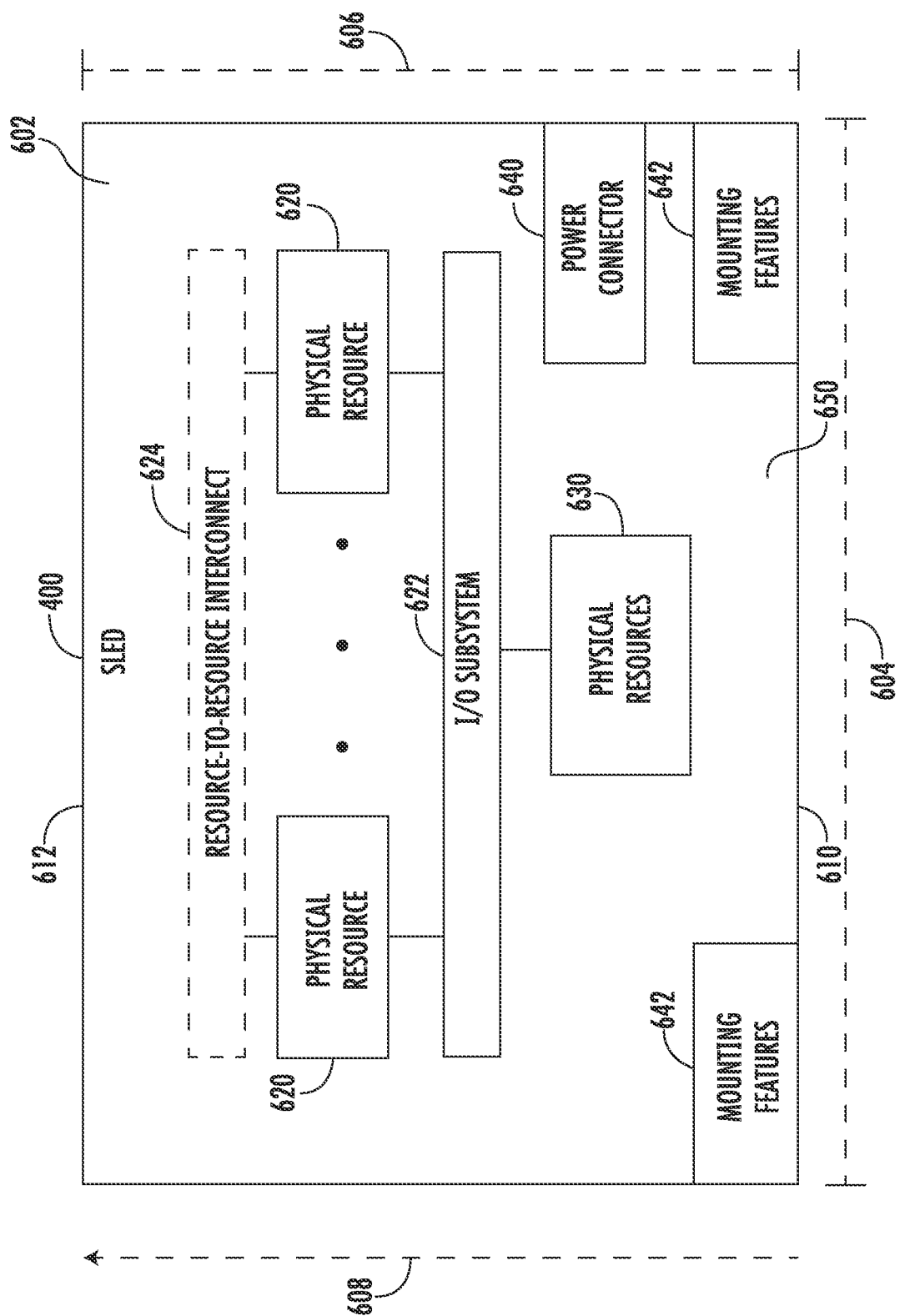
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS.

12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no backplane (e.g., a backplate of the chassis) to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, power is provided to the processors 820 through vias directly under the processors 820 (e.g., through the bottom side 750 of the chassis-less circuit board substrate 602), providing an increased thermal budget, additional current and/or voltage, and better voltage control over typical boards.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
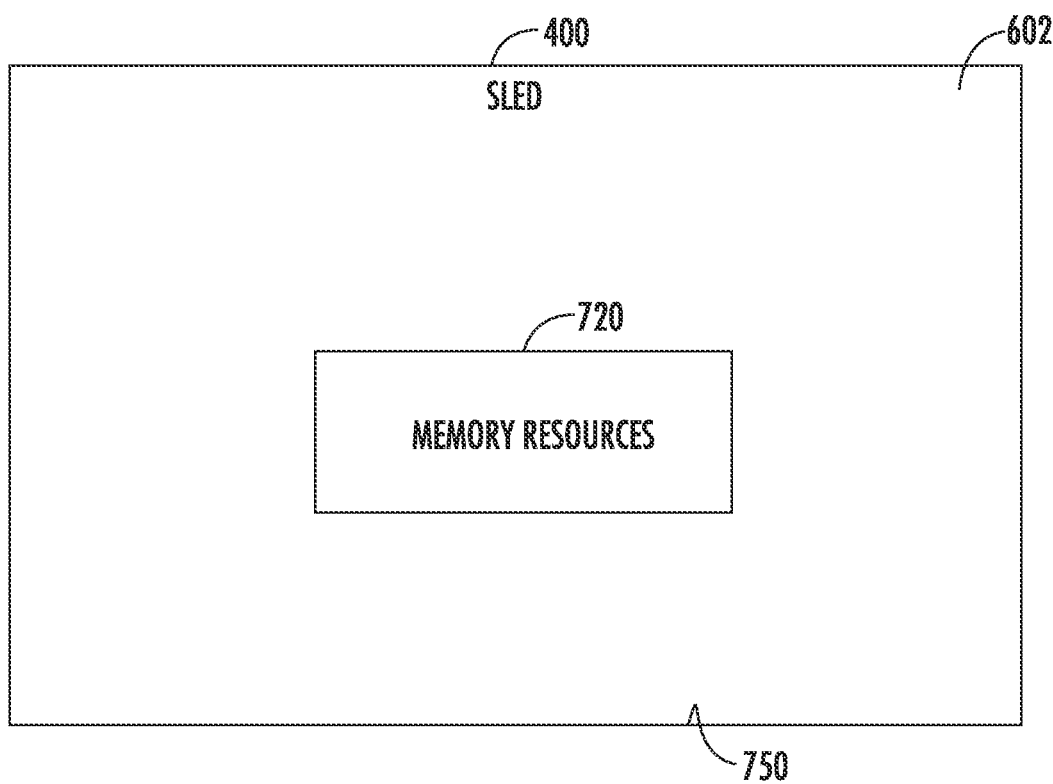
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory devices 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
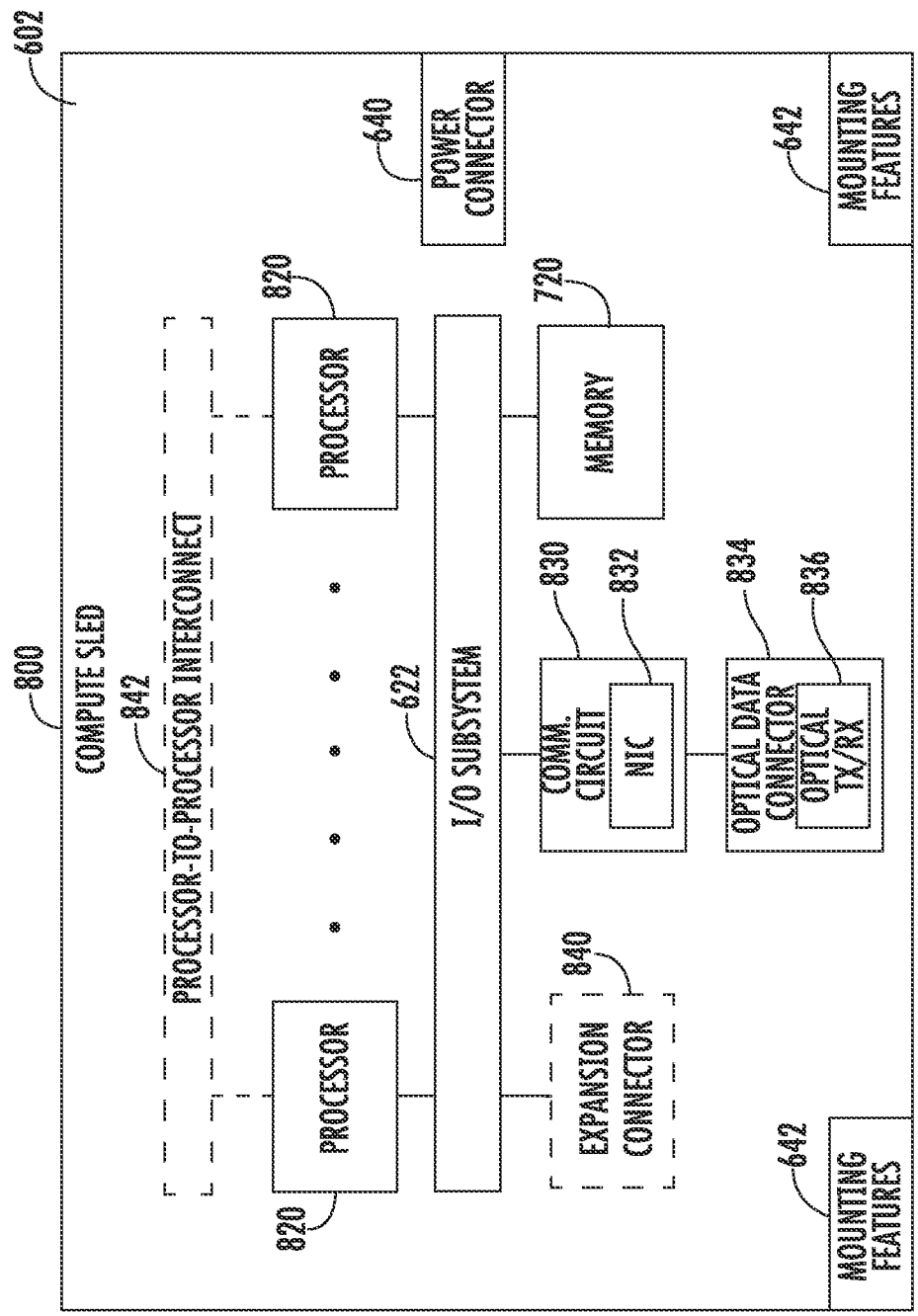
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
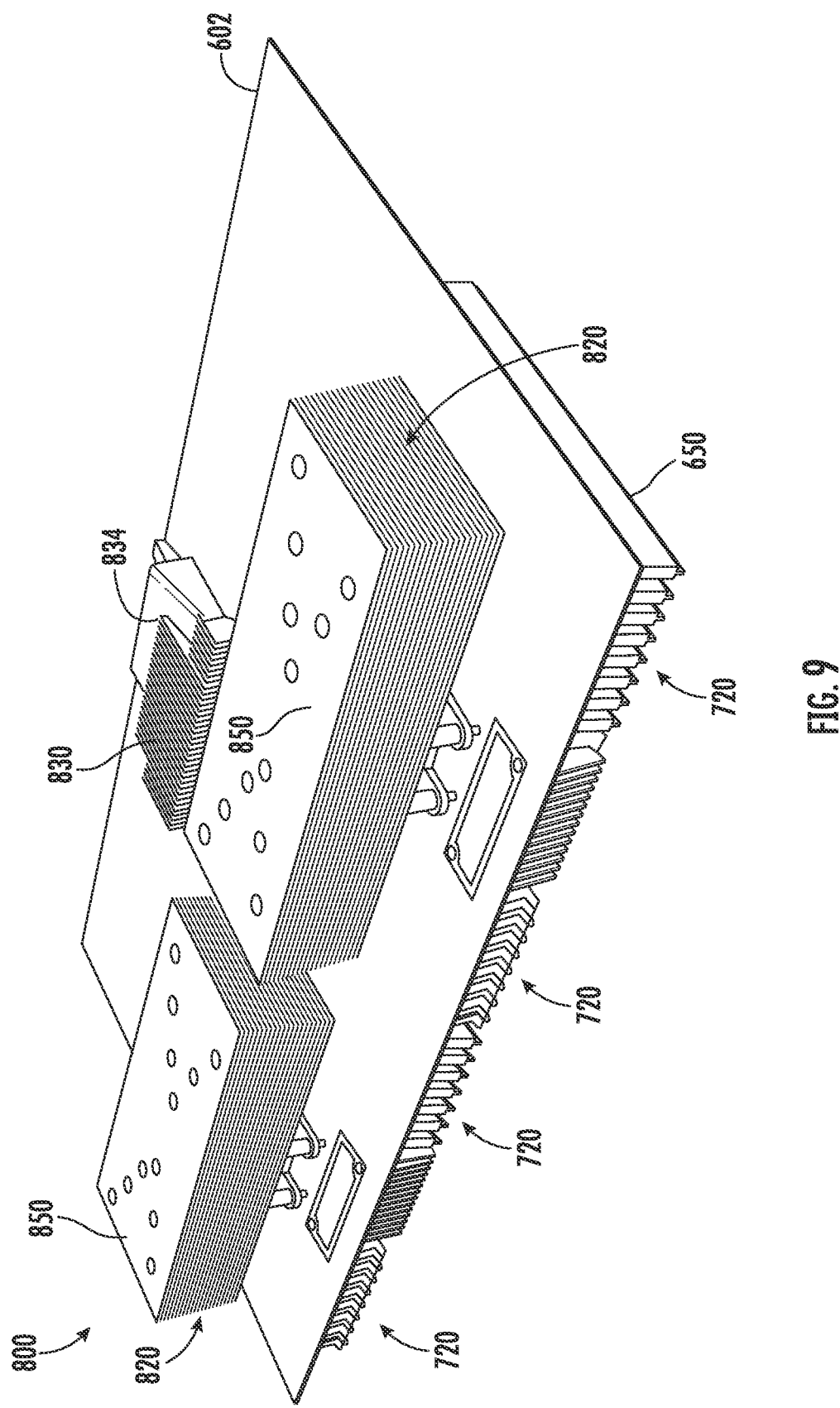
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsinks.

Figure 10:
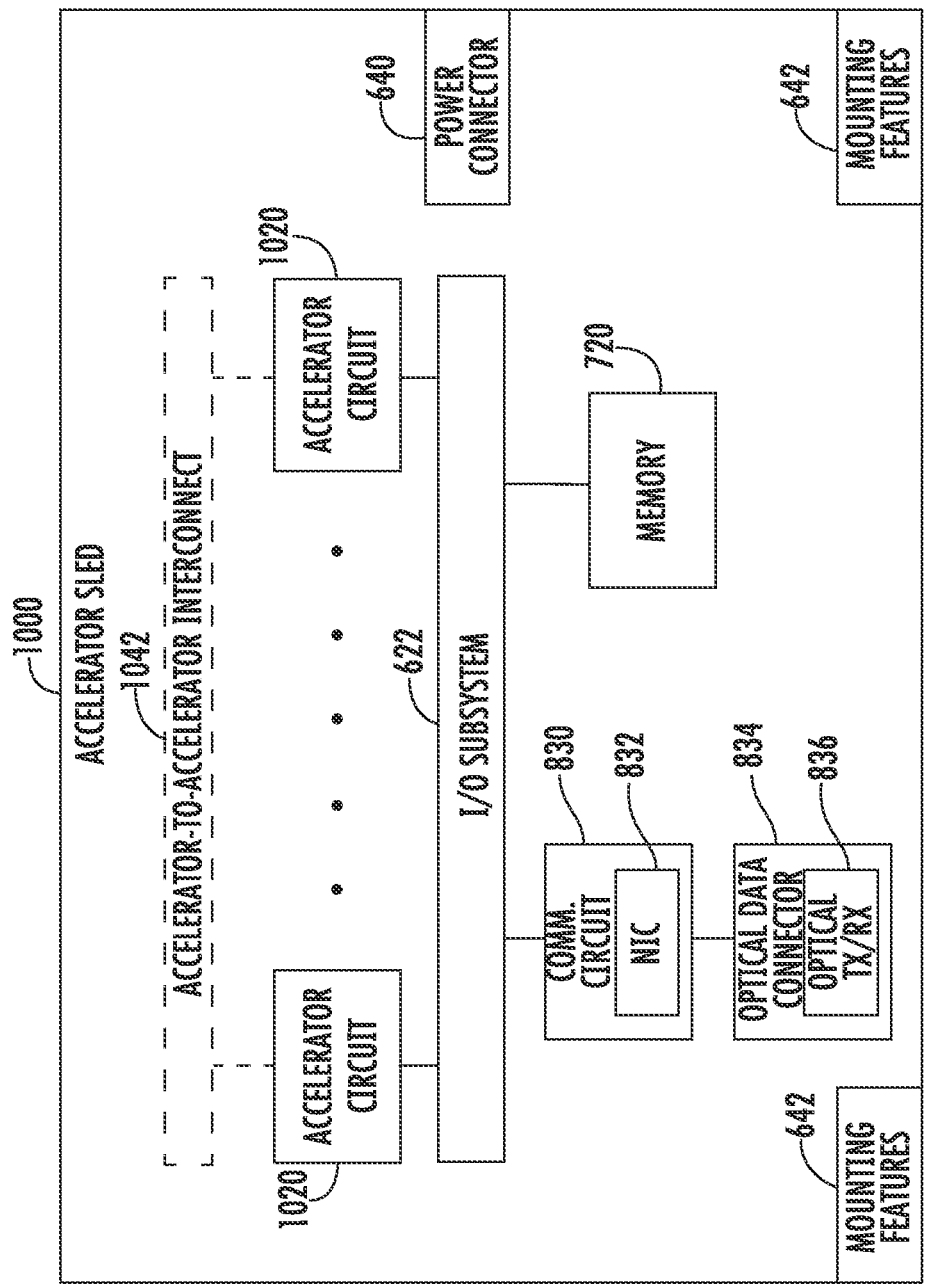
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is optimized, or otherwise configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
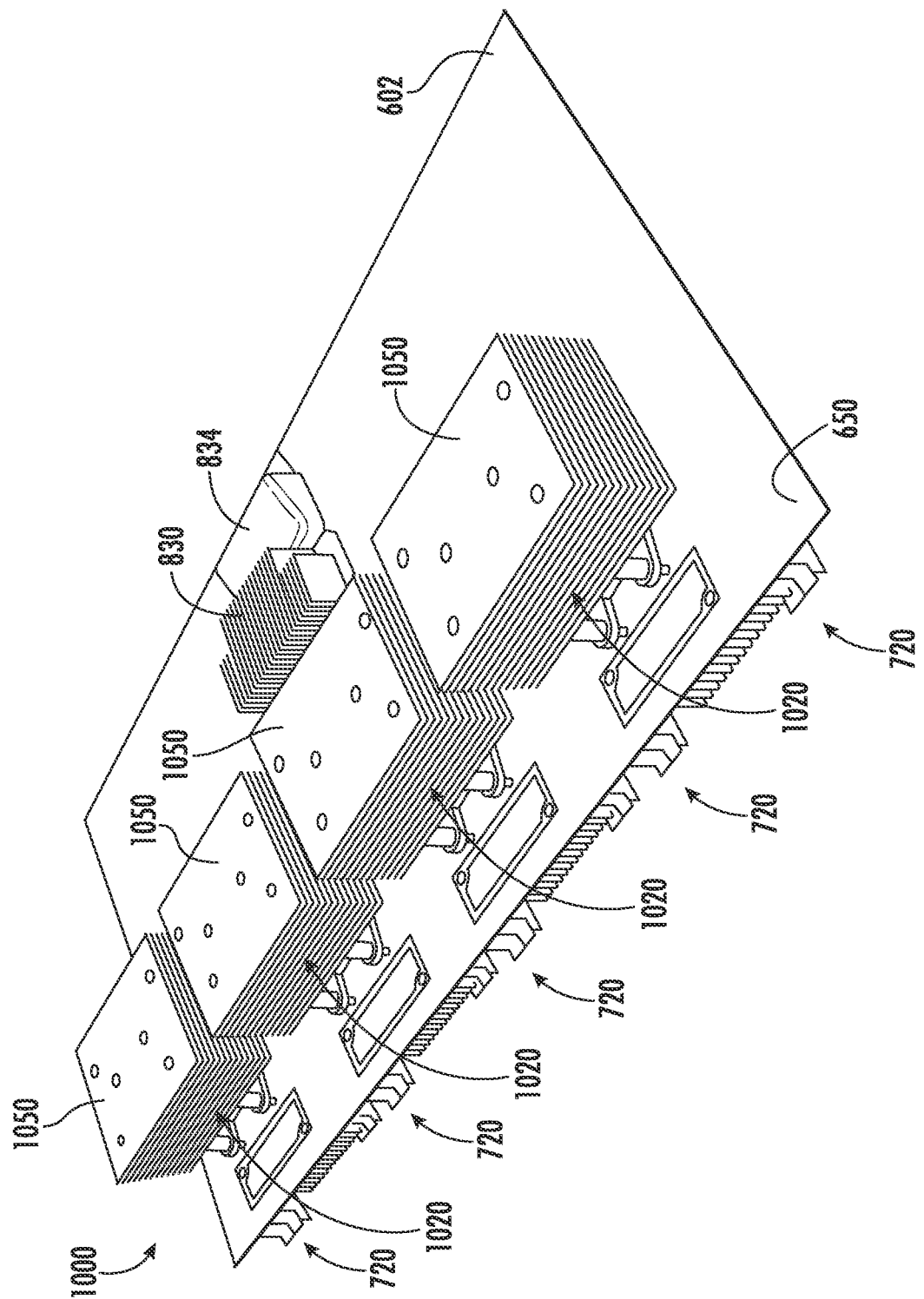
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than tradition heatsinks because of the "free" area provided by the memory devices 750 being located on the bottom side 750 of the chassis-less circuit board substrate 602 rather than on the top side 650.

Figure 12:
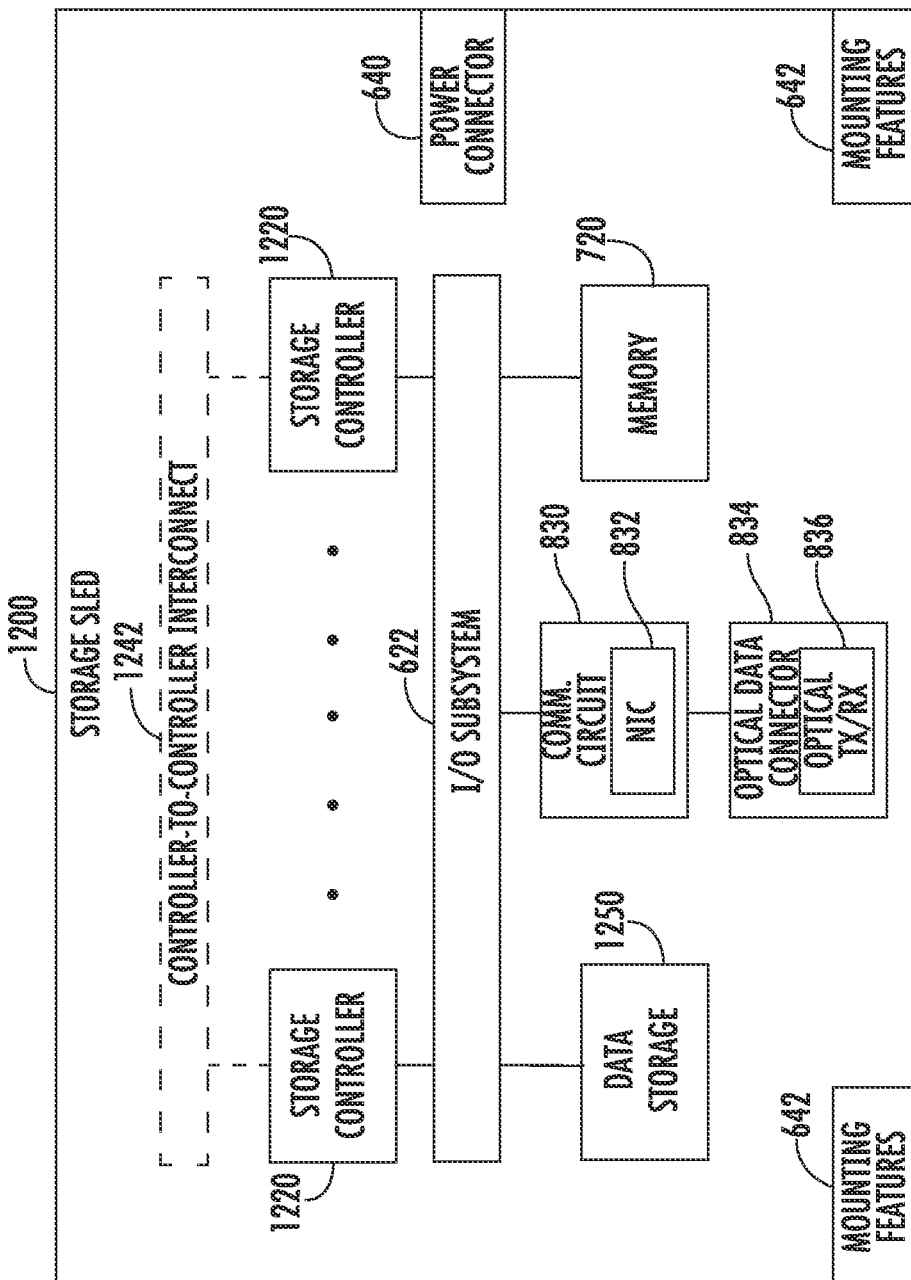
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is optimized, or otherwise configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
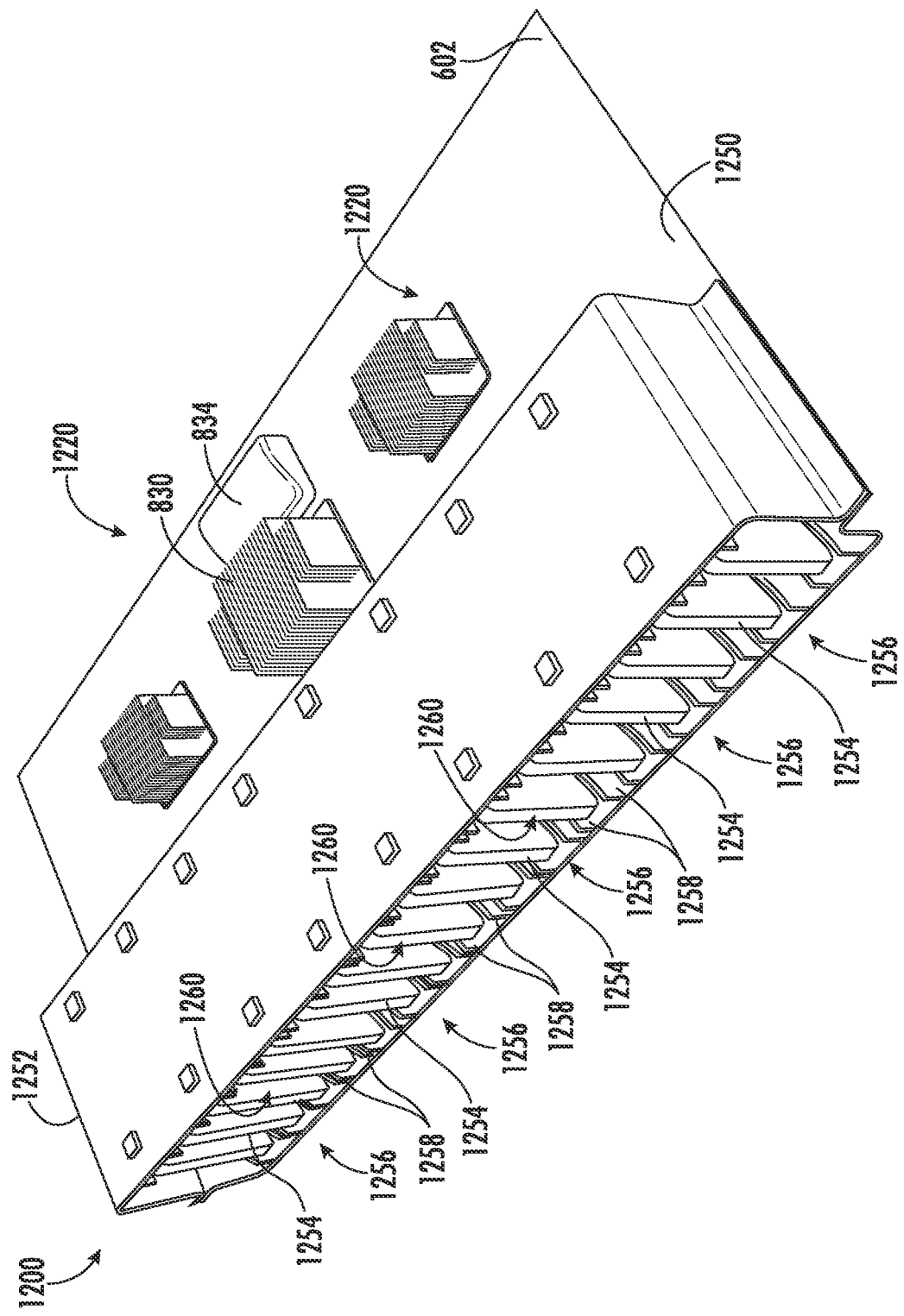
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
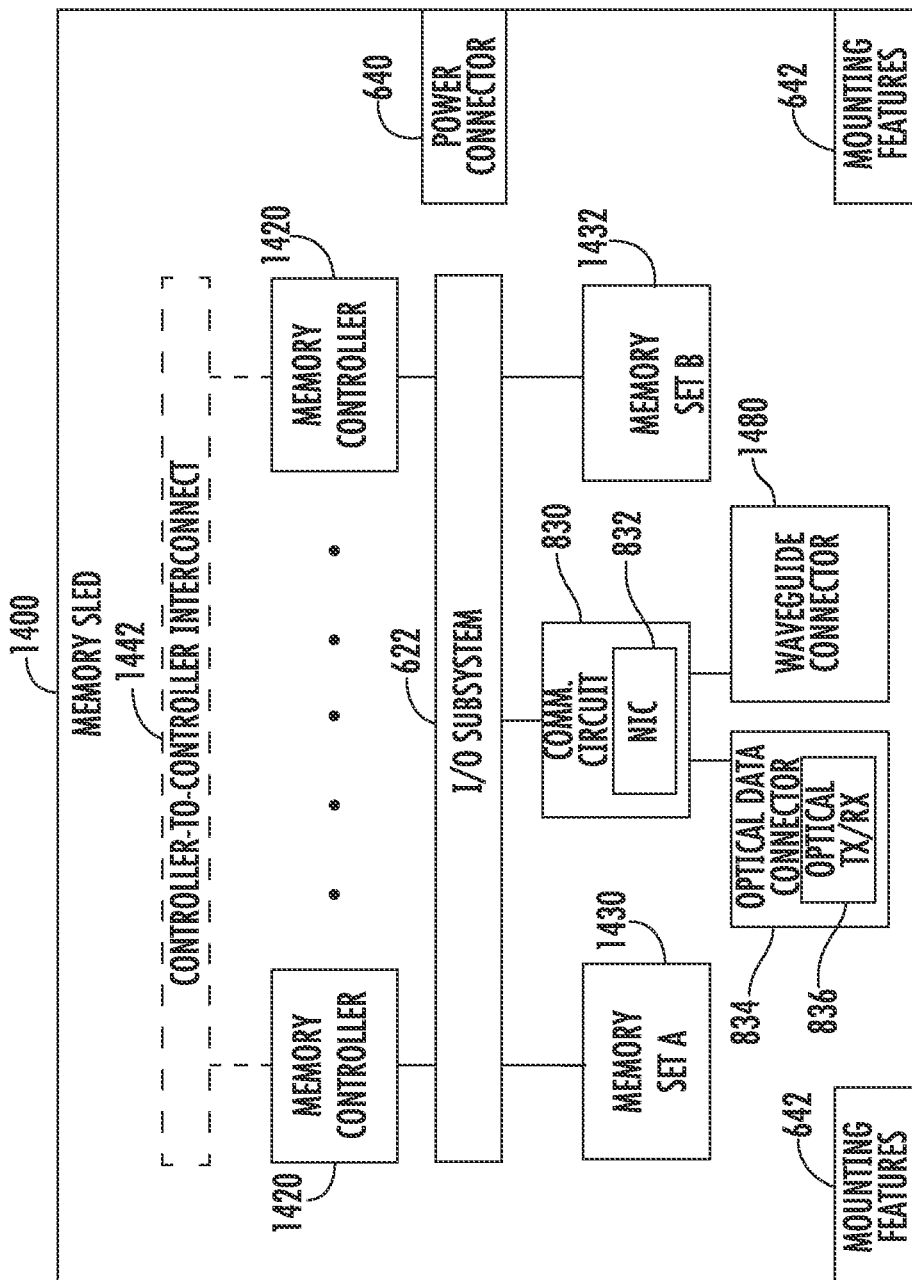
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each storage controller 1220 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Rt (i.e., transmit) lanes. Each lane, in the illustrative embodiment, is either 16 Ghz or 32 Ghz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
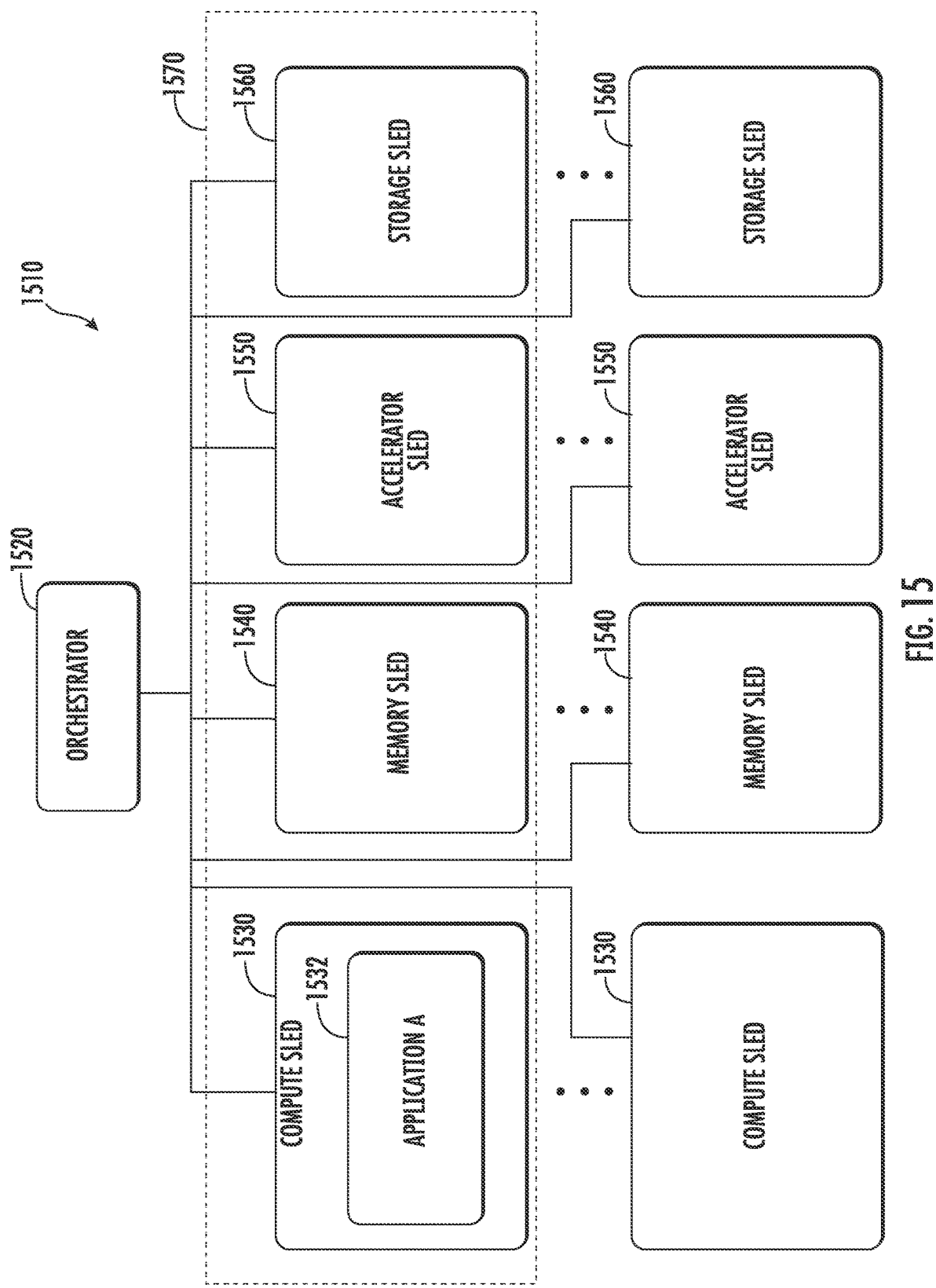
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising one or more compute devices (e.g., one or more compute sleds 800) executing orchestration software (e.g., a cloud operating environment, such as OpenStack) and communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement (SLA) for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. If the so, the orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
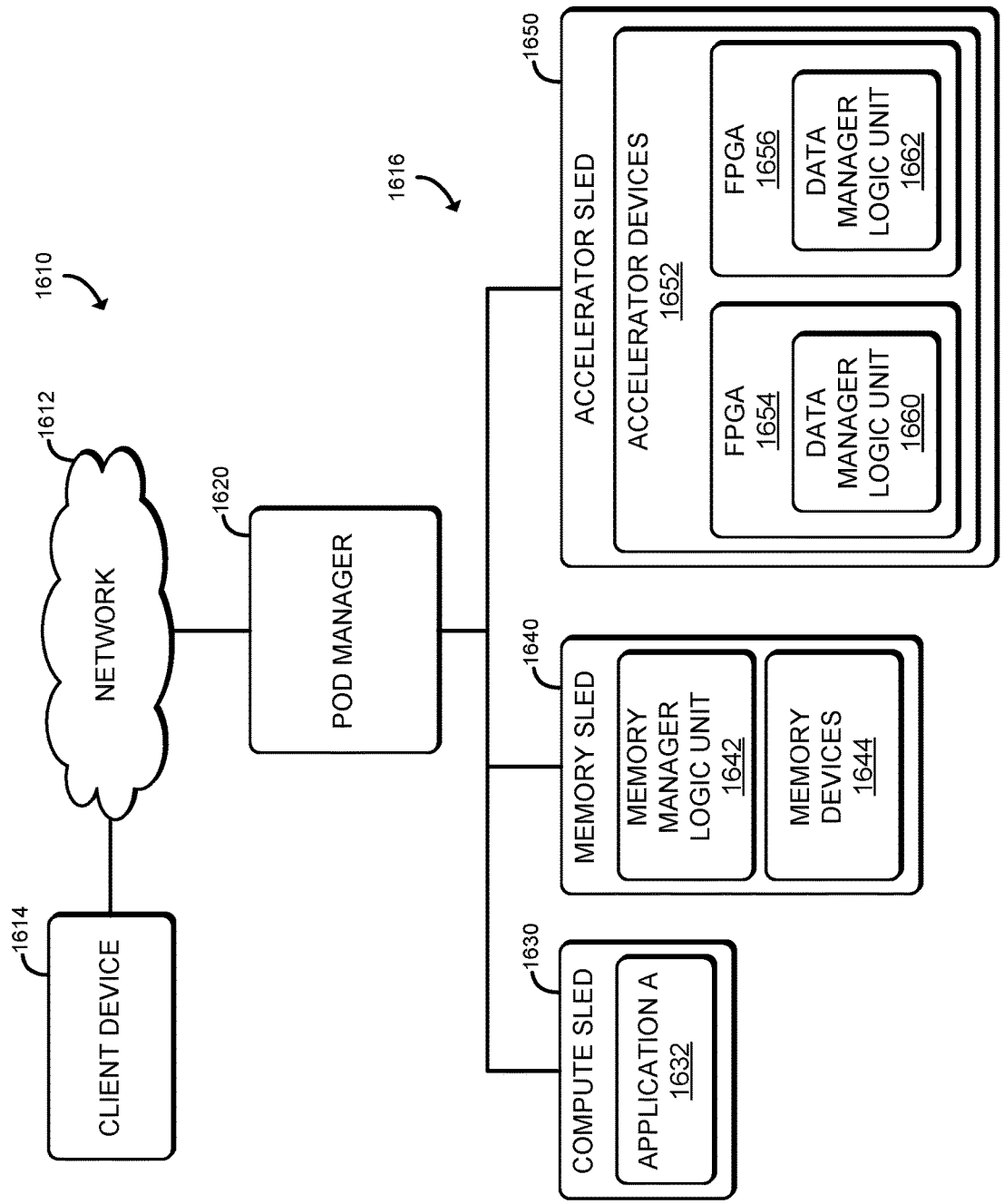
FIG. 16 is a simplified block diagram of at least one embodiment of a system for providing streamlined provisioning of accelerated functions.

Referring now to FIG. 16, a system 1610 for providing streamlined provisioning of accelerated functions on an as-requested basis (e.g., as a service) includes a pod manager 1620, similar to the orchestrator server 1520, in communication with multiple sleds 1616, including a compute sled 1630, a memory sled 1640, and an accelerator sled 1650. In operation, the compute sled 1630, which is similar to the compute sled 1530, executes an application 1632 (e.g., a workload), such as on behalf of a client device 1614. The memory sled 1640, which is similar to the memory sled 1540, includes a memory manager logic unit 1642 and a set of memory devices 1644, which together form a pool of memory usable by the sleds on an as-needed basis. The memory manager logic unit 1642 may be embodied as any device or circuitry capable of assigning identifiers (e.g., handles) to data sets to be accessed (e.g., read from and/or written to) by other sleds 1616 in the system 1610. The accelerator sled 1650, which is similar to the accelerator sled 1550, includes a set of accelerator devices 1652, similar to the accelerator circuits 1020 described above with reference to FIG. 10. In the illustrative embodiment, the set of accelerator devices 1652 includes two FPGAs 1654, 1656. In other embodiments, the set of accelerator devices 1652 may include any devices or circuitry (e.g., FPGAs, ASICs, GPUs, co-processor(s), etc.) capable of accelerating (e.g., increasing the speed of execution of) one or more functions. Further, in the illustrative embodiment, each accelerator device 1654, 1656, includes a data manager logic unit 1660, 1662, each of which may be embodied as any device or circuitry (e.g., a set of logic gates, a co-processor, an ASIC, etc.) capable of streaming (e.g., obtaining on an as-needed basis) data (e.g., input data) from the memory sled 1640 during the acceleration of functions that have been assigned to the accelerator device 1654, 1656, and likewise, streaming data (e.g., output data) to the memory sled 1640 as the data is produced, thereby offloading communication and buffering operations from the components of the accelerator devices 1654, 1656 that are to perform the acceleration of functions (e.g., portions of workloads).

In operation, the compute sled 1630 may determine which compute device (e.g., the pod manager 1620) in the system 1610 is providing an acceleration scheduling service (e.g., a service to assign functions to accelerator devices). The compute sled 1630 may also send a data set to be used as input to the accelerated function into the memory pool of the memory sled 1640, receive a service identifier (e.g., a handle) for the written data set, and send a request for acceleration to the compute device (e.g., the pod manager 1620) providing the acceleration scheduling service. The request, in the illustrative embodiment, includes the service identifier and descriptor data indicative of the type of function to be accelerated and a performance threshold to be satisfied (e.g., a reference to a service level agreement (SLA), a quality of service, a latency, etc.). The compute device providing the acceleration scheduling service (e.g., the pod manager 1620) matches the descriptor data to the available accelerator devices 1652 to select one or more of the accelerator devices 1652 to perform acceleration of the function, and sends a request to the accelerator device 1652 (e.g., to the corresponding accelerator sled 1650) with the service identifier. The accelerator device 1652 then obtains the input data set from the memory sled, operates on the input data set (e.g., by executing the accelerated function) to produce a resultant data set and writes the resultant data set to the memory pool in association with the service identifier. The pod manager 1620 then notifies the compute sled 1630 that the acceleration has been completed, and the compute sled 1630 reads the resultant data set from the memory pool (e.g., by sending a read request to the memory sled 1640 with the service identifier and receiving the corresponding resultant data). As such, the system 1610 enables an intermediary compute device (e.g., the pod manager 1620) to match compute sleds with accelerator devices on an as-requested basis while avoiding the network communication load that would otherwise result from the intermediary compute device (e.g., the pod manager 1620) receiving and sending data sets between the sleds 1616. Accordingly, the system 1610 may execute workloads more efficiently than known systems.

As described above, the pod manager 1620, the sleds 1616, and the client device 1614 are illustratively in communication via the network 1612, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 17:
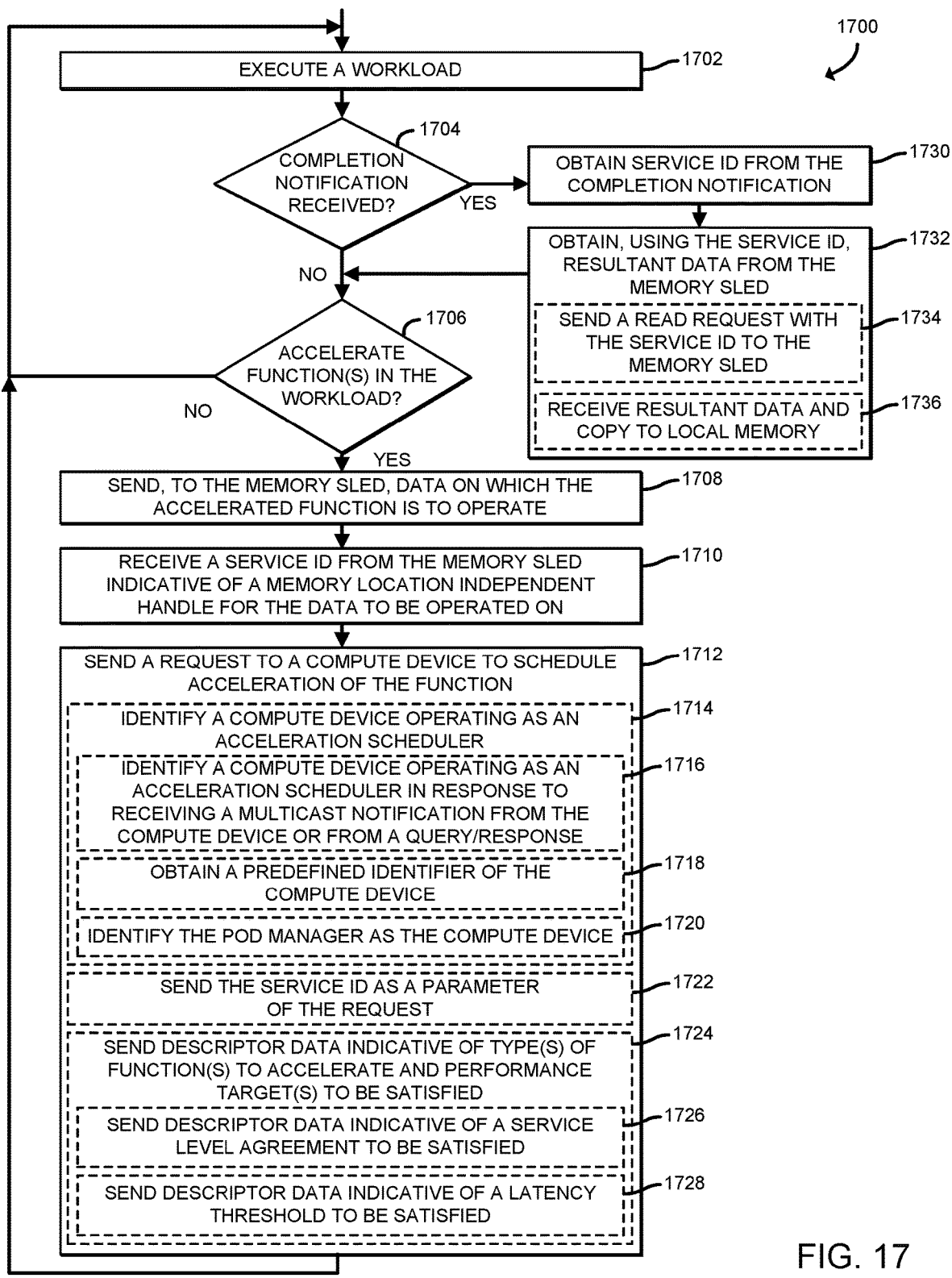
FIG. 17 is a simplified block diagram of at least one embodiment of a method for utilizing streamlined provisioning of accelerated functions that may be performed by a compute sled of FIG. 16.

Referring now to FIG. 17, the compute sled 1630, in operation, may execute a method 1700 for utilizing streamlined provisioning of accelerated functions. The method 1700 begins with block 1702, in which the compute sled 1630 executes a workload (e.g., the application 1632). As indicated in block 1704, the compute sled 1630 may receive a completion notification (e.g., from the pod manager 1620) indicating the acceleration of a function has been completed. Initially, the compute sled 1630 may not receive a completion notification, as it has not yet requested acceleration of any functions. In response to a determination that a completion notification has not been received, the method 1700 advances to block 1706, in which the compute sled 1630 determines whether to accelerate one or more functions of the workload 1632. In doing so, the compute sled 1630 may determine that a function in the workload has been flagged (e.g., in metadata associated with the workload) as being amenable to acceleration (e.g., would execute more efficiently on an accelerator device having a different architecture than the processor 820 of the compute sled 1630) or that the function, when executed previously by the processor 820, did not satisfy a predefined target performance threshold (e.g., an expected amount of time to complete the function). In other embodiments, the compute sled 1630 may determine whether to request acceleration of a function based on other factors. Regardless, in response to a determination to accelerate the function, the method 1700 advances to block 1708, in which the compute sled 1630 sends, to the memory sled 1640, data (e.g., an input data set) on which the accelerated function is to operate. For example, the compute sled 1630 may send a set of data to be compressed, encrypted, or otherwise operated on, to the memory sled 1640, as described in more detail herein. Subsequently, in block 1710, the compute sled 1630 receives, from the memory sled 1640, a service identifier indicative of a handle for the data set to be operated on (e.g., the data set that was sent in block 1708). In the illustrative embodiment, the service identifier is a handle that is memory location independent, meaning the service identifier is level of indirection away from the actual location (e.g., physical or logical address) of where the data resides in the memory sled 1640, thereby allowing the memory sled 1640 to relocate, resize, overwrite, or otherwise modify the data associated with the acceleration of the function in the memory 1644, as needed, without affecting the service identifier provided to the compute sled 1630.

Afterwards, in block 1712, the compute sled 1630, sends a request to a compute device (e.g., the pod manager 1620) to schedule acceleration of the function. In doing so, and as indicated in block 1714, the compute sled 1630, in the illustrative embodiment, identifies a compute device operating as an acceleration scheduler (e.g., will match a request for acceleration with one or more accelerator devices 1652 capable of performing the acceleration). To do so, the compute sled 1630 may identify a compute device operating as an acceleration scheduler in response to receiving a multicast notification (e.g., a communication sent to multiple sleds) from the compute device that indicates that the compute device is operating as an acceleration scheduler. Alternatively, the compute sled 1630 may affirmatively query the compute device and receive a response indicating that the compute device is operating as an acceleration scheduler, as indicated in block 1716. Additionally or alternatively, the compute sled 1630 may obtain a predefined identifier of the compute device (e.g., from a configuration file), as indicated in block 1718. In the illustrative embodiment, the compute sled 1630 identifies the pod manager 1620 as the compute device operating as the acceleration scheduler, as indicated in block 1718.

The compute sled 1630, in the illustrative embodiment, sends the service identifier, obtained from the memory sled 1640 in block 1710, as a parameter of the request for acceleration, as indicated in block 1722. Additionally, as indicated in block 1724, the compute sled 1630 sends descriptor data, which may be embodied any data indicative of the type(s) (e.g., compression, encryption, etc.) of function(s) to be accelerated and one or more performance targets to be satisfied. In doing so, the compute sled 1630 may send descriptor data indicative of a service level agreement (SLA) to be satisfied, as indicated in block 1726 and/or may send descriptor data indicative of a latency threshold to be satisfied (e.g., that the acceleration of the function(s) are to be completed within a predefined amount of time), as indicated in block 1728. Subsequently, the method 1700 loops back to block 1702, in which the compute sled 1630 continues execution of the workload. Returning to block 1704, if the compute sled 1630 receives a completion notification (e.g., from the pod manager 1620 or other compute device that is operating as the acceleration scheduler), the method 1700 advances to block 1730. In the illustrative embodiment, the completion notification includes the service identifier and, in block 1730, the compute sled 1630 obtains (e.g., parses) the service identifier from the completion notification. In block 1732, the compute sled 1630 obtains, using the service identifier, the resultant data (e.g., the output data produced by the accelerator device(s) that performed the accelerated function associated with the acceleration request) from the memory sled 1640. In doing so, in the illustrative embodiment, the compute sled 1630 sends a read request that includes the service identifier (e.g., from block 1730) to the memory sled 1640, as indicated in block 1734. Further, as indicated in block 1736, the compute sled 1630 receives the resultant data from the memory sled 1640 and copies it to local memory of the compute sled 1630 (e.g., the memory resources 720 of FIG. 7). Subsequently, the method 1700 advances to block 1706 to again determine whether to request acceleration of any functions in the workload.

Figure 18:
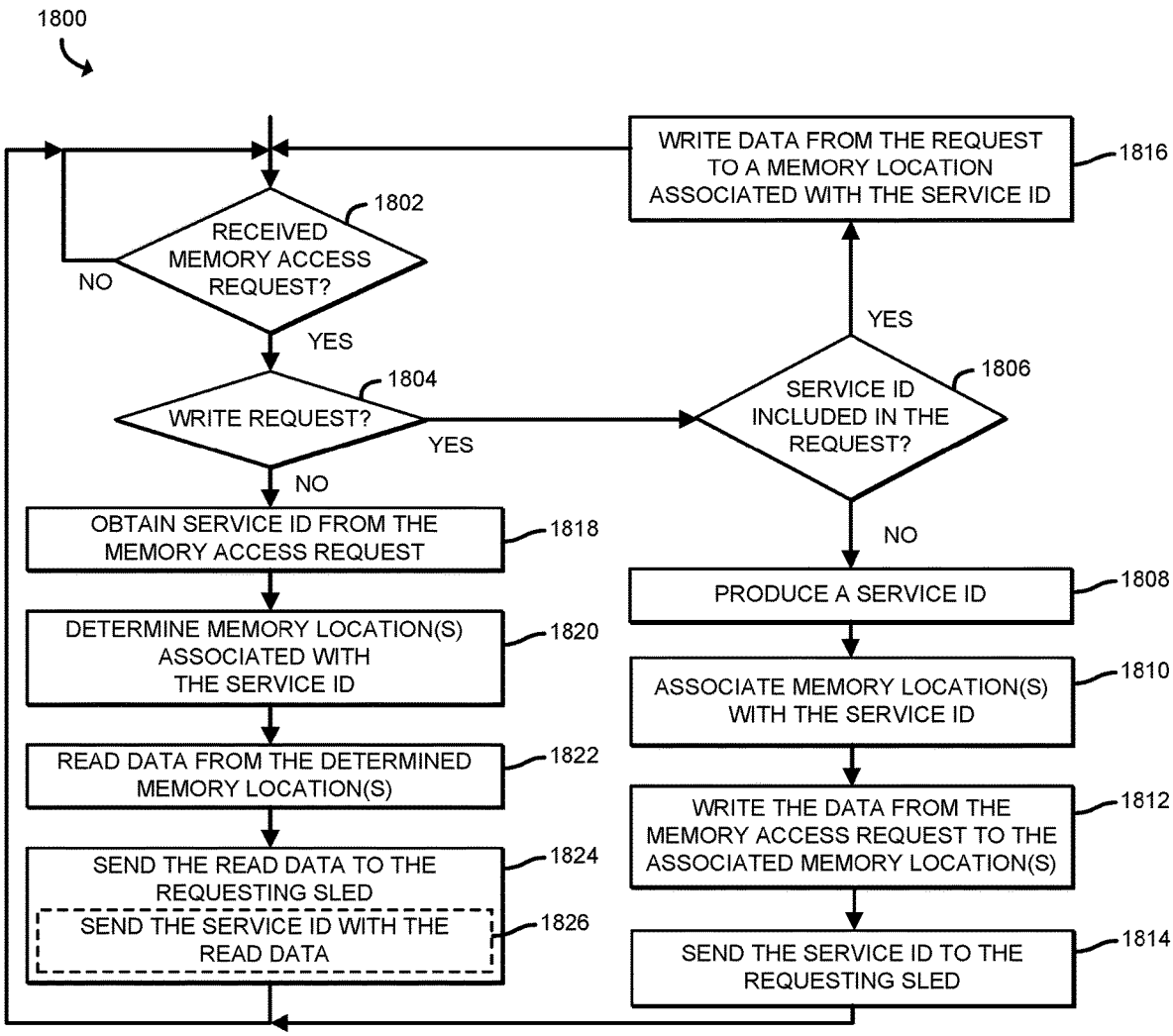
FIG. 18 is a simplified block diagram of at least one embodiment of a method for facilitating streamlined provisioning of accelerated functions that may be performed by a memory sled of FIG. 16.

Referring now to FIG. 18, the memory sled 1640, in operation, may execute a method 1800 for facilitating streamlined provisioning of accelerated functions in the system 1610. The method 1800 begins with block 1802, in which the memory sled 1640 determines whether a memory access request has been received. In response to a determination that a memory access request has been received, the method 1800 advances to block 1804 in which the memory sled 1640 determines the subsequent course of action as a function of whether the memory access request is a write request. If the memory access request is a write request, the method 1800 advances to block 1806, in which the memory sled 1640 determines whether a service identifier is included in the write request. If not, the method 1800 advances to block 1808 in which the memory sled 1640 produces a service identifier (e.g., as a function of a present time stamp, an identifier of the requesting compute sled 1630, a hash of the data to be written, and/or other factors). Further, in block 1810, the memory sled 1640 associates memory locations (e.g., physical or logical addresses where the data is to be written) with the service identifier, such as in a memory map. Additionally, the memory sled 1640 writes the data from the memory access request to the associated memory locations, as indicated in block 1812. Subsequently, in block 1814, the memory sled 1640 sends the service identifier to the requesting sled (e.g., the compute sled 1630). Referring back to block 1806, if the service identifier was included in the write request, the method 1800 instead advances to block 1816, in which the memory sled 1640 writes data from the request to one or more memory locations associated with the service identifier. In either case, the method 1800 loops back to block 1802 to await another memory access request.

Returning to block 1804, if the memory sled 1640 instead determines that the memory access request is not a write request (e.g., is a read request), the method 1800 advances to block 1818, in which the memory sled 1640 obtains the service identifier from the memory access request. Further, in block 1820, the memory sled 1640 determines the memory location(s) associated with the service identifier (e.g., from the association produced in block 1810). In block 1822, the memory sled 1640 reads data from the determined memory location(s) and in block 1824, the memory sled 1640 sends the read data to the requesting sled (e.g., the compute sled 1630, the accelerator sled 1650, etc.). In doing so, in the illustrative embodiment, the memory sled 1640 sends the service identifier with the read data, as indicated in block 1826. Subsequently, the method 1800 loops back to block 1802 to await another memory access request.

Figure 19:
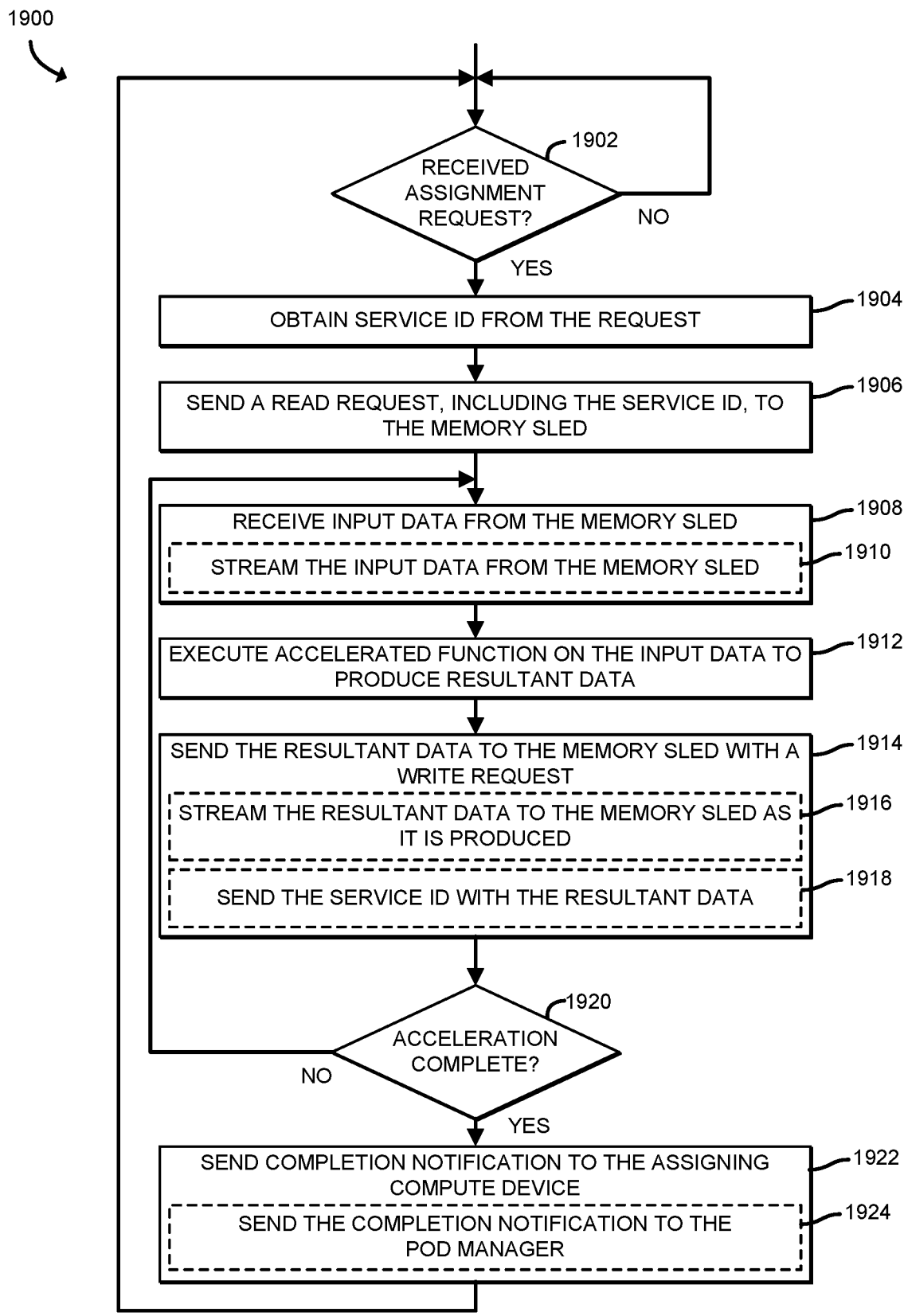
FIG. 19 is a simplified block diagram of at least one embodiment of a method for accelerating a function that may be performed by an accelerator sled of FIG. 16.

Referring now to FIG. 19, the accelerator 1650, in operation, may perform a method 1900 for accelerating a function on an as-requested basis. The method 1900 begins with block 1902, in which the accelerator sled 1650 determines whether a request (e.g., from the pod manager 1620 or other compute device operating as an acceleration scheduler) to assign acceleration of a function to one or more identified accelerator devices 1652 of the accelerator sled 1650 has been received. If so, the method 1900 advances to block 1904, in which the accelerator sled 1650 obtains (e.g., parses) the service identifier from the request. Subsequently, in block 1906, the accelerator sled 1650 (e.g., with the data manager logic unit 1660 of the FPGA 1654) sends a request, including the service identifier, to the memory sled 1640. In block 1908, the accelerator sled 1650 receives input data from the memory sled (e.g., the data provided by the compute sled in block 1708 of FIG. 17). In doing so, in the illustrative embodiment, the accelerator sled 1650 streams (e.g., obtains subsets of the input data on an as-needed basis) the input data from the memory sled 1640, as indicated in block 1910. As indicated in block 1912, the accelerator sled 1650 executes (e.g., with the associated accelerator device 1652, such as the FPGA 1654) the accelerated function to produce resultant data (e.g., output data). Further, and as indicated in block 1914, the accelerator sled 1650 sends the resultant data to the memory sled 1640 using a write request. In doing so, in the illustrative embodiment, the accelerator sled 1650 streams the resultant data to the memory sled 1640 as the resultant data is produced (e.g., rather than waiting until execution of the function has completed), as indicated in block 1916. As indicated in block 1918, the accelerator sled 1650 sends the service identifier (e.g., from block 1904) with the resultant data to the memory sled 1640. In block 1920, the accelerator sled 1650 determines whether acceleration of the function is complete. If not, the method 1900 loops back to block 1908 to continue to receive input data and accelerate the function. Otherwise, the method 1900 advances to block 1922, in which the accelerator sled 1650 sends a completion notification to the assigning compute device (e.g., the compute device that sent the assignment request from block 1902). In doing so, in the illustrative embodiment, the accelerator sled 1650 sends the completion notification to the pod manager 1620. Subsequently, the method 1900 loops back to block 1902 to await another assignment request.

Figure 20:
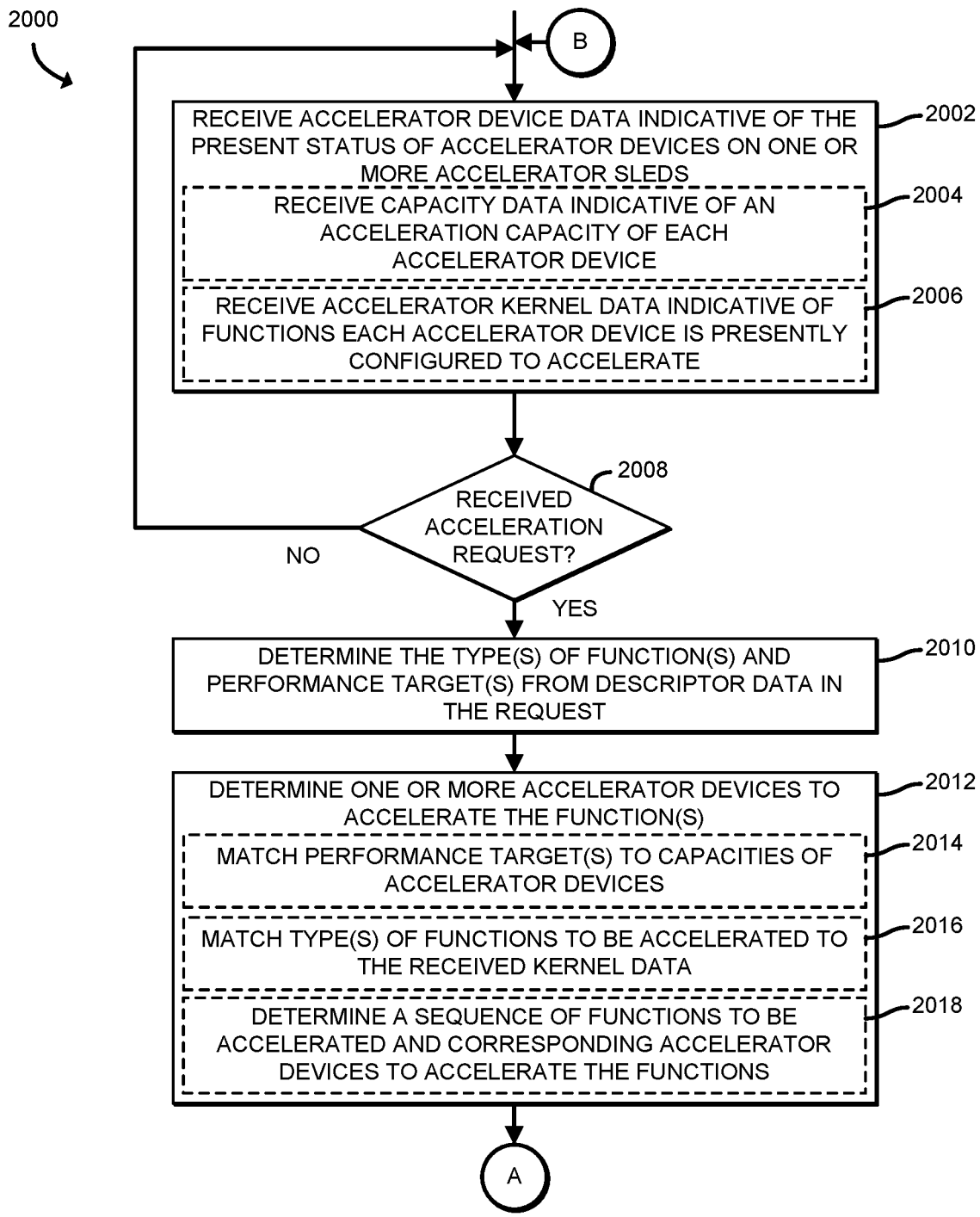
FIGS. 20-21 are a simplified flow diagram of at least one embodiment of a method for coordinating the provisioning of accelerated functions as a service that may be performed by a pod manager of FIG. 16.

Referring now to FIG. 20, the pod manager 1620, in operation, may execute a method 2000 for coordinating the provisioning of accelerated functions on an as-requested basis (e.g., as a service). The method 2000 begins with block 2002 in which the pod manager 1620 receives accelerator device data indicative of the present status of accelerator devices (e.g., the accelerator devices 1652) on one or more accelerator sleds 1650. In doing so, the pod manager 1620, in the illustrative embodiment, receives capacity data indicative of an acceleration capacity (e.g., number of idle FPGA slots, present load, etc.) of each accelerator device 1652, as indicated in block 2004. Additionally, in the illustrative embodiment, the pod manager 1620 receives accelerator kernel data indicative of function(s) that each accelerator device is presently configured to accelerate (e.g., identifiers of function names, identifiers of types of functions such as compression, encryption, etc.), as indicated in block 2006. Subsequently, in block 2008, the pod manager 1620 determines whether an acceleration request has been received (e.g., from the compute sled 1630). If not, the method 2000 loops back to block 2002 in which the pod manager 1620 receives updated accelerator device data. Otherwise, the method 2000 advances to block 2010 in which the pod manager 1620 determines the type(s) of function(s) to be accelerated and performance target(s) from descriptor data included in the request (e.g., the descriptor data from block 1724 of FIG. 17). In block 2012, the pod manager 1620 determines one or more accelerator devices to accelerate the function(s). In doing so, the pod manager 1620, in the illustrative embodiment, matches the performance target(s) to the capacities of the accelerator devices 1652, as indicated in block 2014. In doing so, the pod manager 1620 may select an accelerator device 1652 having a larger capacity for a performance target that is relatively more demanding (e.g., a lower latency target) or, conversely, select an accelerator device 1652 having less capacity for a performance target that is relatively less demanding. As indicated in block 2016, the pod manager 1620 may match the type(s) of the function(s) to be accelerated to the received kernel data from block 2006 (e.g., to match a request to accelerate a compression function with an FPGA having a kernel configured to perform a compression function). In some embodiments, the pod manager 1620 may determine a sequence in which the multiple functions associated with the request are to be performed (e.g., based on the data dependence of each function, based on a sequence defined in the descriptor data, etc.) and the accelerator devices that are to perform each function, as indicated in block 2018. Subsequently, the method 2000 advances to block 2020 of FIG. 21, in which the pod manager 1620 sends, to the determined accelerator device(s) (e.g., to the corresponding accelerator sled 1650), request(s) to accelerate a corresponding function.

Figure 21:
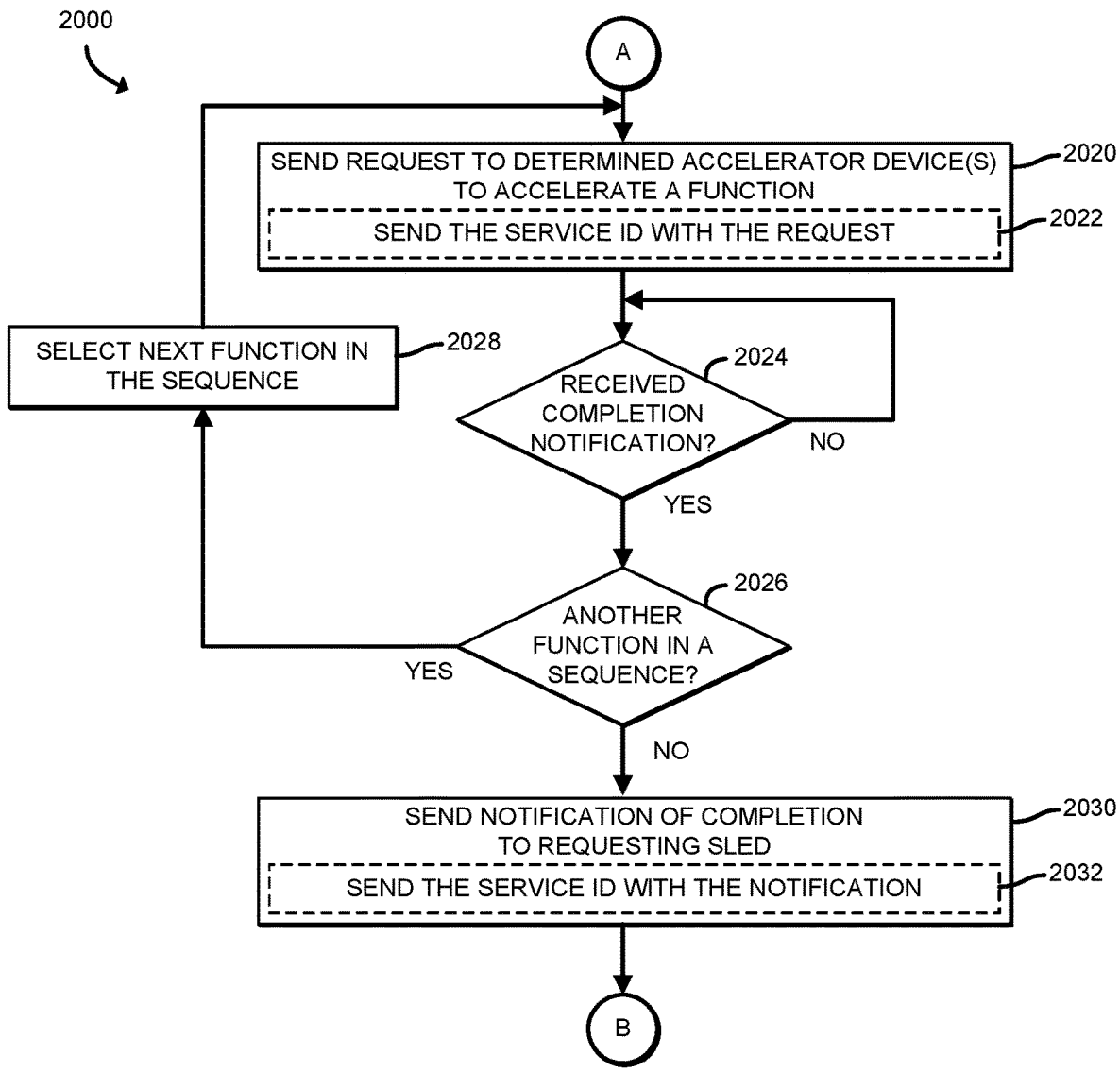

Referring now to FIG. 21, in sending the request(s), the pod manager 1620, in the illustrative embodiment, sends the service identifier with the request, as indicated in block 2022. In block 2024, the pod manager 1620 determines whether a completion notification has been received from the accelerator device(s) 1652. If not, the pod manager 1620 continues to await a completion notification. Otherwise, if the pod manager 1620 receives a completion notification, the method 2000 advances to block 2026 in which the pod manager 1620 determines whether another function exists in a sequence of functions associated with the acceleration request. If so, the method 2000 advances to block 2028, in which the pod manager 1620 selects the next function in the sequence, and the method 2000 loops back to block 2020, in which the pod manager 1620 requests the corresponding accelerator device(s) to accelerate the function. Otherwise, the method 2000 instead advances to block 2030, in which the pod manager 1620 sends a notification of completion to the requesting sled (e.g., the compute sled 1630). In doing so, the pod manager 1620 sends the service identifier with the notification, as indicated in block 2032. Subsequently, the method 2000 loops back to block 2002 of FIG. 20, in which the pod manager 1620 receives updated accelerator device data, as described above.

EXAMPLES

Illustrative examples of the technologies disclosed herein are provided below. An embodiment of the technologies may include any one or more, and any combination of, the examples described below.

Example 1 includes a compute sled comprising a network interface controller; and circuitry to (i) determine whether to accelerate a function of a workload executed by the compute sled; (ii) send, to a memory sled and in response to a determination to accelerate the function, a data set on which the function is to operate; (iii) receive, from the memory sled, a service identifier indicative of a memory location independent handle for data associated with the function; (iv) send, to a compute device, a request to schedule acceleration of the function on the data set; (v) receive a notification of completion of the acceleration of the function; and (vi) obtain, in response to receipt of the notification and using the service identifier, a resultant data set from the memory sled, wherein the resultant data set was produced by an accelerator device during acceleration of the function on the data set.

Example 2 includes the subject matter of Example 1, and wherein to obtain the resultant data set from the memory sled comprises to send, with the network interface controller, a read a request with the service identifier to the memory sled; receive, with the network interface controller, the resultant data set from the memory sled after the read request has been sent; and copy the resultant data set to a local memory of the compute sled.

Example 3 includes the subject matter of any of Examples 1 and 2, and wherein the circuitry is further to determine whether the compute device is to operate as an acceleration scheduler and wherein to send the request to schedule acceleration of the function comprises to send, to the compute device, the request in response to a determination that the compute device is to operate as an acceleration scheduler.

Example 4 includes the subject matter of any of Examples 1-3, and wherein the network interface controller is to receive a multicast notification from the compute device that identifies the compute device as an acceleration scheduler and wherein to determine whether the compute device is to operate as an acceleration scheduler comprises to determine, in response to receipt of the multicast notification, that the compute device is to operate as an acceleration scheduler.

Example 5 includes the subject matter of any of Examples 1-4, and wherein the network interface controller is to send a query to the compute device to determine whether the compute device is to operate as the acceleration scheduler; and receive a response from the compute device that acknowledges that the compute device is to operate as the acceleration scheduler.

Example 6 includes the subject matter of any of Examples 1-5, and wherein to send, to a compute device, a request to schedule acceleration of the function on the data set comprises to send the request to a pod manager.

Example 7 includes the subject matter of any of Examples 1-6, and wherein to send the request comprises to send descriptor data indicative of a type of function to be accelerated.

Example 8 includes the subject matter of any of Examples 1-7, and wherein to send the request comprises to send descriptor data that is further indicative of a performance target to be satisfied.

Example 9 includes the subject matter of any of Examples 1-8, and wherein to send descriptor data that is further indicative of a performance target to be satisfied comprises to send data indicative of a service level agreement to be satisfied.

Example 10 includes the subject matter of any of Examples 1-9, and wherein to send descriptor data that is further indicative of a performance target to be satisfied comprises to send data indicative of a latency threshold to be satisfied.

Example 11 includes one or more machine-readable storage media comprising a plurality of instructions stored thereon that, in response to being executed, cause a compute sled to determine whether to accelerate a function of a workload executed by the compute sled; send, to a memory sled and in response to a determination to accelerate the function, a data set on which the function is to operate; receive, from the memory sled, a service identifier indicative of a memory location independent handle for data associated with the function; send, to a compute device, a request to schedule acceleration of the function on the data set; receive a notification of completion of the acceleration of the function; and obtain, in response to receipt of the notification and using the service identifier, a resultant data set from the memory sled, wherein the resultant data set was produced by an accelerator device during acceleration of the function on the data set.

Example 12 includes the subject matter of Example 11, and wherein to obtain the resultant data set from the memory sled comprises to send, with the network interface controller, a read a request with the service identifier to the memory sled; receive, with the network interface controller, the resultant data set from the memory sled after the read request has been sent; and copy the resultant data set to a local memory of the compute sled.

Example 13 includes the subject matter of any of Examples 11 and 12, and wherein, when executed, the plurality of instructions further cause the compute sled to determine whether the compute device is to operate as an acceleration scheduler and wherein to send the request to schedule acceleration of the function comprises to send, to the compute device, the request in response to a determination that the compute device is to operate as an acceleration scheduler.

Example 14 includes the subject matter of any of Examples 11-13, and wherein, when executed, the plurality of instructions further cause the compute sled to receive a multicast notification from the compute device that identifies the compute device as an acceleration scheduler and wherein to determine whether the compute device is to operate as an acceleration scheduler comprises to determine, in response to receipt of the multicast notification, that the compute device is to operate as an acceleration scheduler.

Example 15 includes the subject matter of any of Examples 11-14, and wherein, when executed, the plurality of instructions further cause the compute sled to send a query to the compute device to determine whether the compute device is to operate as the acceleration scheduler; and receive a response from the compute device that acknowledges that the compute device is to operate as the acceleration scheduler.

Example 16 includes the subject matter of any of Examples 11-15, and wherein to send, to a compute device, a request to schedule acceleration of the function on the data set comprises to send the request to a pod manager.

Example 17 includes the subject matter of any of Examples 11-16, and wherein to send the request comprises to send descriptor data indicative of a type of function to be accelerated.

Example 18 includes the subject matter of any of Examples 11-17, and wherein to send the request comprises to send descriptor data that is further indicative of a performance target to be satisfied.

Example 19 includes the subject matter of any of Examples 11-18, and wherein to send descriptor data that is further indicative of a performance target to be satisfied comprises to send data indicative of a service level agreement to be satisfied.

Example 20 includes the subject matter of any of Examples 11-19, and wherein to send descriptor data that is further indicative of a performance target to be satisfied comprises to send data indicative of a latency threshold to be satisfied.

Example 21 includes a compute device comprising circuitry for determining whether to accelerate a function of a workload executed by the compute sled; circuitry for sending, to a memory sled and in response to a determination to accelerate the function, a data set on which the function is to operate; circuitry for receiving, from the memory sled, a service identifier indicative of a memory location independent handle for data associated with the function; means for sending, to a compute device, a request to schedule acceleration of the function on the data set; circuitry for receiving a notification of completion of the acceleration of the function; and circuitry for obtaining, in response to receipt of the notification and using the service identifier, a resultant data set from the memory sled, wherein the resultant data set was produced by an accelerator device during acceleration of the function on the data set.

Example 22 includes a method comprising determining, by a compute sled, whether to accelerate a function of a workload executed by the compute sled; sending, by the compute sled and to a memory sled, and in response to a determination to accelerate the function, a data set on which the function is to operate; receiving, by the compute sled and from the memory sled, a service identifier indicative of a memory location independent handle for data associated with the function; sending, by the compute sled and to a compute device, a request to schedule acceleration of the function on the data set; receiving, by the compute sled, a notification of completion of the acceleration of the function; and obtaining, by the compute sled and in response to receipt of the notification, and using the service identifier, a resultant data set from the memory sled, wherein the resultant data set was produced by an accelerator device during acceleration of the function on the data set.

Example 23 includes the subject matter of Example 22, and wherein obtaining the resultant data set from the memory sled comprises sending, with a network interface controller of the compute sled, a read request with the service identifier to the memory sled; receiving, with the network interface controller of the compute sled, the resultant data set from the memory sled after the read request has been sent; and copying, by the compute sled, the resultant data set to a local memory of the compute sled.

Example 24 includes the subject matter of any of Examples 22 and 23, and further including determining, by the compute sled, whether the compute device is to operate as an acceleration scheduler and wherein sending the request to schedule acceleration of the function comprises sending, to the compute device, the request in response to a determination that the compute device is to operate as an acceleration scheduler.

Example 25 includes the subject matter of any of Examples 22-24, and further including receiving, by the compute sled, a multicast notification from the compute device that identifies the compute device as an acceleration scheduler and wherein determining whether the compute device is to operate as an acceleration scheduler comprises to determine, in response to receipt of the multicast notification, that the compute device is to operate as an acceleration scheduler.

The invention claimed is:

1. An apparatus comprising:
a network interface; and
circuitry to couple with the network interface, the circuitry to:
cause a data set to be written to a memory pool based on a determination to accelerate a function of a workload;
receive an identifier from a memory pool manager, the identifier indicative of a memory location associated with data of the function;
cause an accelerator device to use the data set written to the memory pool in order to produce a resultant data set;
send a read request to the memory pool manager that includes the identifier to obtain the resultant data set from the memory pool; and
cause the resultant data set to be stored to a local memory.

2. The apparatus of claim 1, further comprising the circuitry to:
send, to a compute device, a request to schedule acceleration of the function on the data set in order to cause the accelerator device to use the data set to produce the resultant data set.

3. The apparatus of claim 2, further comprising the circuitry to:
send a query to the compute device to determine whether the compute device is to operate as an acceleration scheduler; and
receive a response from the compute device that acknowledges that the compute device is to operate as the acceleration scheduler.

4. The apparatus of claim 2, wherein to send the request comprises to send descriptor data indicative of a type of function to be accelerated.

5. The apparatus of claim 4, wherein to send the request comprises to send descriptor data that is further indicative of a performance target to be satisfied.

6. The apparatus of claim 5, wherein to send descriptor data that is further indicative of a performance target to be satisfied comprises to send data indicative of a service level agreement to be satisfied.

7. The apparatus of claim 5, wherein to send descriptor data that is further indicative of a performance target to be satisfied comprises to send data indicative of a latency threshold to be satisfied.

8. The apparatus of claim 1, comprising the circuitry to send a read request to the memory pool manager responsive to receipt of a notification of completion of the accelerated function by the accelerator device.

9. The apparatus of claim 1, wherein the accelerator device comprises a field programmable gate array.

10. At least one non-transitory machine-readable storage media comprising a plurality of instructions stored thereon that, in response to being executed, cause a compute resource to:
cause a data set to be written to a memory pool based on a determination to accelerate a function of a workload;
receive an identifier from a memory pool manager, the identifier indicative of a memory location associated with data of the function;
cause an accelerator device to use the data set written to the memory pool in order to produce a resultant data set;
send a read request to the memory pool manager that includes the identifier to obtain the resultant data set from the memory pool; and
cause the resultant data set to be stored to a local memory.

11. The at least one non-transitory machine-readable storage media of claim 10, the instructions to further cause the compute resource to:
send, to a compute device, a request to schedule acceleration of the function on the data set in order to cause the accelerator device to use the data set to produce the resultant data set.

12. The at least one non-transitory machine-readable storage media of claim 11, the instructions to further cause the compute resource to:
send a query to the compute device to determine whether the compute device is to operate as an acceleration scheduler; and
receive a response from the compute device that acknowledges that the compute device is to operate as the acceleration scheduler.

13. The at least one non-transitory machine-readable storage media of claim 11, wherein to send the request comprises to send descriptor data indicative of a type of function to be accelerated.

14. The at least one non-transitory machine-readable storage media of claim 13, wherein to send the request comprises to send descriptor data that is further indicative of a performance target to be satisfied.

15. The at least one non-transitory machine-readable storage media of claim 14, wherein to send descriptor data that is further indicative of a performance target to be satisfied comprises to send data indicative of a service level agreement to be satisfied.

16. The at least one non-transitory machine-readable storage media of claim 14, wherein to send descriptor data that is further indicative of a performance target to be satisfied comprises to send data indicative of a latency threshold to be satisfied.

17. The at least one non-transitory machine-readable storage media of claim 10, comprising the instructions to cause the compute resource to send a read request to the memory pool manager responsive to receipt of a notification of completion of the accelerated function by the accelerator device.

18. The at least one non-transitory machine-readable storage media of claim 10, wherein the accelerator device comprises a field programmable gate array.

19. A method comprising:
causing, by circuitry of a compute resource, a data set to be written to a memory pool based on a determination to accelerate a function of a workload;
receiving an identifier from a memory pool manager, the identifier indicative of a memory location associated with data of the function;
causing an accelerator device to use the data set written to the memory pool in order to produce a resultant data set;
sending a read request to the memory pool manager that includes the identifier to obtain the resultant data set from the memory pool; and
causing the resultant data set to be stored to a local memory.

20. The method of claim 19, further comprising:
sending, to a compute device, a request to schedule acceleration of the function on the data set in order to cause the accelerator device to use the data set to produce the resultant data set.

21. The method of claim 20, further comprising:
sending a query to the compute device to determine whether the compute device is to operate as an acceleration scheduler; and
receiving a response from the compute device that acknowledges that the compute device is to operate as the acceleration scheduler.

22. The method of claim 20, wherein sending the request comprises to send descriptor data indicative of a type of function to be accelerated.

23. The method of claim 22, wherein sending the request comprises to send descriptor data that is further indicative of a performance target to be satisfied.

24. The method of claim 23, wherein sending descriptor data that is further indicative of a performance target to be satisfied comprises to send data indicative of a service level agreement to be satisfied.

25. The method of claim 23, wherein sending descriptor data that is further indicative of a performance target to be satisfied comprises to send data indicative of a latency threshold to be satisfied.

26. The method of claim 19, comprising sending a read request to the memory pool manager responsive to receipt of a notification of completion of the accelerated function by the accelerator device.

27. The method of claim 19, wherein the accelerator device comprises a field programmable gate array.

* * * * *